(12) United States Patent
Lee et al.

(10) Patent No.: US 12,105,965 B2
(45) Date of Patent: Oct. 1, 2024

(54) STORAGE DEVICE AND STORAGE SYSTEM INCLUDING THE SAME

(71) Applicant: Samsung Electronics Co., Ltd., Suwon-si (KR)

(72) Inventors: Seungho Lee, Suwon-si (KR); Yunho Youm, Suwon-si (KR); Myungsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/206,195

(22) Filed: Jun. 6, 2023

(65) Prior Publication Data

US 2024/0192865 A1    Jun. 13, 2024

(30) Foreign Application Priority Data

Dec. 12, 2022 (KR) ........................ 10-2022-0172472

(51) Int. Cl.
| | |
|---|---|
| G06F 3/06 | (2006.01) |
| G06F 11/10 | (2006.01) |
| G06F 21/12 | (2013.01) |
| G06F 21/14 | (2013.01) |
| G06F 21/31 | (2013.01) |

(52) U.S. Cl.
CPC .......... *G06F 3/0623* (2013.01); *G06F 3/0622* (2013.01); *G06F 3/0659* (2013.01); *G06F 3/0667* (2013.01); *G06F 3/0679* (2013.01); *G06F 11/1044* (2013.01); *G06F 21/125* (2013.01); *G06F 21/14* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 8,464,073 B2 | 6/2013 | Salessi | |
| 8,583,835 B1* | 11/2013 | Kan | G06F 13/16 710/5 |
| 10,055,377 B2 | 8/2018 | Rupanagunta et al. | |
| 10,168,958 B2 | 1/2019 | Yokota | |
| 10,880,081 B2 | 12/2020 | Kim et al. | |
| 11,012,512 B1 | 5/2021 | Mallick et al. | |
| 11,423,129 B2 | 8/2022 | Kim et al. | |
| 2012/0159193 A1* | 6/2012 | Spradlin | G06F 21/79 713/190 |
| 2017/0026342 A1* | 1/2017 | Sidana | H04L 9/008 |
| 2020/0117722 A1 | 4/2020 | Kang | |
| 2022/0131703 A1* | 4/2022 | Salamon | G06F 21/64 |
| 2022/0188012 A1* | 6/2022 | Anchi | G06F 3/0604 |
| 2022/0197658 A1* | 6/2022 | Agron | G06F 9/30145 |

* cited by examiner

*Primary Examiner* — Nathan Sadler
(74) *Attorney, Agent, or Firm* — Sughrue Mion, PLLC

(57) ABSTRACT

A storage device, including at least one nonvolatile memory device configured to store data; and a storage controller configured to: generate a virtual table including a plurality of random values, wherein each random value of the plurality of random values designates an index from among a plurality of indexes corresponding to a plurality of main functions; transmit the virtual table to a host; receive from the host a vendor unique command (VUC) generated by the host based on the virtual table; parse the VUC based on the virtual table, perform an operation corresponding to the at least one nonvolatile memory device based on the parsed VUC; and transmit a result of the operation to the host.

20 Claims, 26 Drawing Sheets

V_TB

| IDX | RNV |
|---|---|
| 0 | 0x84548302 |
| 1 | 0x45328302 |
| 2 | 0x23403941 |
| 3 | 0x59642034 |

FIG. 15

RNVa 0 x 8 4 5 4 8 3 0 2
      ⎴⎴⎴ ⎴⎴ ⎴⎴
      SF1  SF2 SF3

| IDX | FUNC |
|---|---|
| 0 | FUNC0 |
| 1 | FUNC1 |
| 2 | FUNC2 |
| 3 | FUNC3 |

| IDX | ARG[3:2] | ARG[1] | ARG[0] | FUNC | RNV |
|---|---|---|---|---|---|
| 0 | 0 | 0.0 | 0.0.0 | FUNC0_0_0 | 0x84548302 |
|   |   |   | 0.0.1 | FUNC0_0_1 | 0x84548303(FUNC0_0_0+0x1) |
|   |   |   | 0.0.2 | FUNC0_0_2 | 0x84548304(FUNC0_0_0+0x2) |
|   |   |   | 0.0.3 | FUNC0_0_3 | 0x84548305(FUNC0_0_0+0x3) |
|   |   | 0.1 |   | FUNC0_1 | 0x84548402(FUNC0_0_0+0x100) |
|   |   | 0.2 | 0.2.0 | FUNC0_2_0 | 0x84548502(FUNC0_0_0+0x200) |
|   |   |   | 0.2.1 | FUNC0_2_1 | 0x84548503(FUNC0_0_0+0x201) |
| 1 | 1 |   |   | FUNC1 | 0x45328302 |
| 2 | 2 | 2.0 | 2.0.0 | FUNC2_0_0 | 0x23403941 |
|   |   | 2.1 | 2.1.0 | FUNC2_1_0 | 0x23403A41(FUNC2_0_0+0x100) |
| 3 | 3 |   |   | FUNC3 | 0x59642034 |

V_TB

| 0x84548302 |
|---|
| 0x45328302 |
| 0x23403941 |
| 0x59642034 |

STORAGE DEVICE AND STORAGE SYSTEM INCLUDING THE SAME

CROSS-REFERENCE TO RELATED APPLICATIONS

This application is based on and claims priority under 35 USC § 119 to Korean Patent Application No. 10-2022-0172472, filed on Dec. 12, 2022, in the Korean Intellectual Property Office, the disclosure of which is incorporated by reference herein in its entirety.

BACKGROUND

1. Field

The disclosure relates to semiconductor integrated circuits, and more particularly to a storage device using a vender unique command and a storage system including the same.

2. Description of Related Art

A vendor unique command (VUC) is a command which is not available to the general public, but is used only by or for specific vendors such as manufacturers. The VUC may be available only when the user is an authorized vendor. Such a VUC may also be a command for checking an internal arrangement of a storage device or testing at the time of fabricating. As a result, when the vendor unique command is exposed, important technologies of the manufacturers may be exposed to the outside.

SUMMARY

Provided is a storage device capable of protecting a vendor unique command (VUC).

Also provided is a storage system capable of protecting a VUC.

Additional aspects will be set forth in part in the description which follows and, in part, will be apparent from the description, or may be learned by practice of the presented embodiments.

In accordance with an aspect of the disclosure, a storage device includes at least one nonvolatile memory device configured to store data; and a storage controller configured to: generate a virtual table including a plurality of random values, wherein each random value of the plurality of random values designates an index from among a plurality of indexes corresponding to a plurality of main functions; transmit the virtual table to a host; receive from the host a vendor unique command (VUC) generated by the host based on the virtual table; parse the VUC based on the virtual table, perform an operation corresponding to the at least one nonvolatile memory device based on the parsed VUC; and transmit a result of the operation to the host.

In accordance with an aspect of the disclosure, a storage system includes a host; and a storage device configured to communicate with the host, and including: at least one nonvolatile memory device configured to store data; and a storage controller configured to control the at least one nonvolatile memory device based on a request from the host, wherein the storage controller is configured to: generate a virtual table including a plurality of random values, wherein each random value of the plurality of random values designates an index from among a plurality of indexes corresponding to a plurality of main functions; and transmit the virtual table to the host, wherein the host is configured to: select a target function from among the plurality of main functions and a plurality of sub functions associated with the plurality of main functions, based on the virtual table; generate a vendor unique command (VUC) designating the target function; and transmit the VUC to the storage controller, and wherein the storage controller is further configured to: parse the VUC based on the virtual table, perform an operation corresponding to the parsed VUC; and transmit a result of the operation to the host.

In accordance with an aspect of the disclosure, a storage system includes a host; and a storage device connected with the host through a link, wherein the storage device is configured to communicate with the host, wherein the storage device includes: at least one nonvolatile memory device configured to store data; and a storage controller configured to control the at least one nonvolatile memory device based on a request from the host, wherein the storage controller is configured to: generate a virtual table including a plurality of random values, wherein each random value of the plurality of random values designates an index from among a plurality of indexes corresponding to a plurality of main functions; and transmit the virtual table to the host, wherein the host is configured to: select a target function from among the plurality of main functions and a plurality of sub functions associated with the plurality of main functions, based on the virtual table; generate a vendor unique command (VUC) designating the target function; and transmit the VUC to the storage controller, and wherein the storage controller is further configured to parse the VUC based on the virtual table and perform an operation corresponding to the parsed VUC, and wherein the host is further configured to: generate a second random value designating the target function based on a first random value from among the plurality of random values, wherein the first random value designates a first main function from among the plurality of main functions; and transmit the second random value as the VUC to the storage controller.

BRIEF DESCRIPTION OF DRAWINGS

The above and other aspects, features, and advantages of certain embodiments of the present disclosure will be more apparent from the following detailed description in conjunction with the accompanying drawings, in which:

FIG. 15 illustrates one of the random values in FIG. 14 according to example embodiments;

FIG. 16 illustrates a function table representing the indexes and the main functions shared by the host and the storage device according to example embodiments;

FIG. 17A illustrates that the virtual table generator generates the virtual table based on main functions and sub functions according to example embodiments;

DETAILED DESCRIPTION

Various example embodiments are described more fully hereinafter with reference to the accompanying drawings, in which some example embodiments are illustrated.

Figure 1:
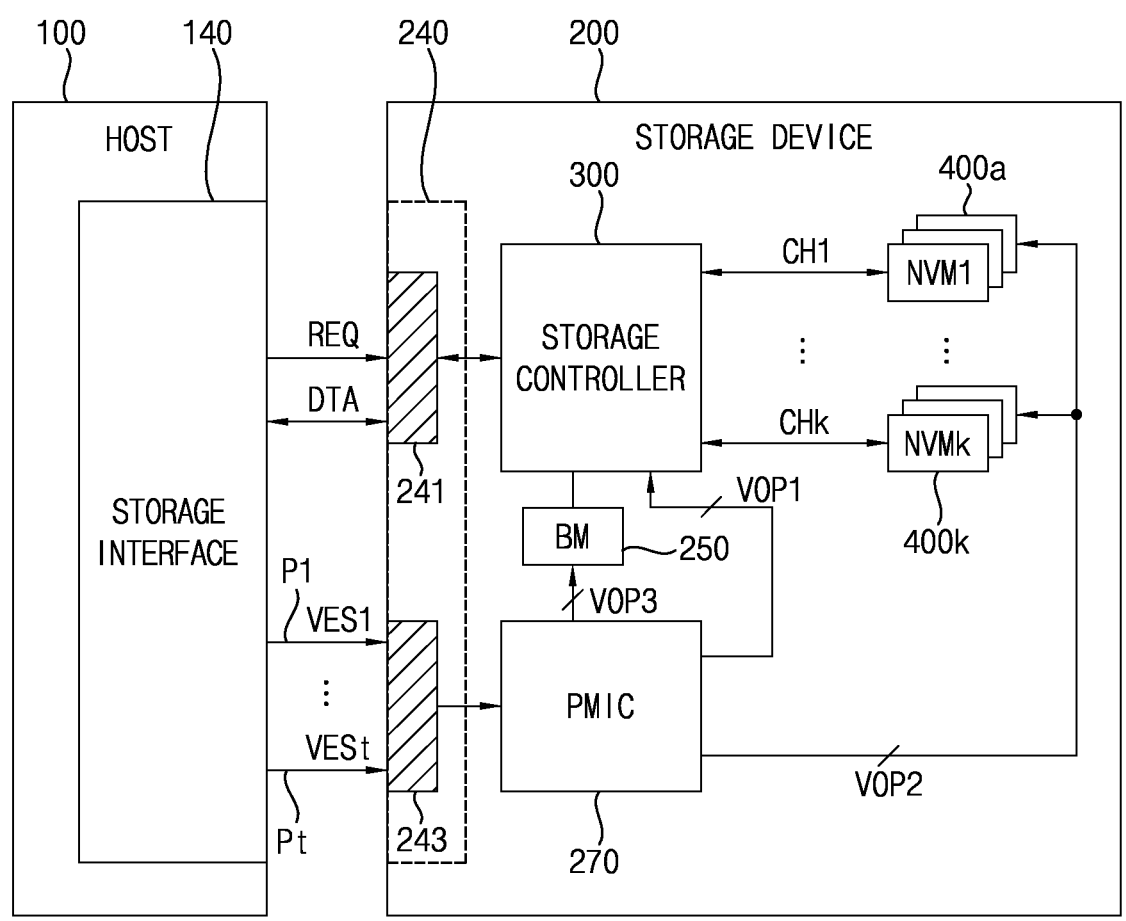
FIG. 1 is a block diagram illustrating a storage system according to example embodiments.

FIG. 1 is a block diagram illustrating a storage system according to example embodiments.

Referring to FIG. 1, a storage system 50 may include a host 100 and a storage device 200. The host 100 may include a storage interface 140.

The storage device 200 may be any kind of storage devices.

The storage device 200 may include a storage controller 300, a plurality of nonvolatile memory devices 400a through 400k (illustrated as NVM1 to NVMk, where k is an integer greater than or equal to two), a power management integrated circuit (PMIC) 270 and a host interface 240. The host interface 240 may include a signal connector 241 and a power connector 243. The storage device 200 may further include a buffer memory (BM) 250 that is implemented with a volatile memory device.

The plurality of nonvolatile memory devices 400a-400k may be used as a storage medium of the storage device 200. In some example embodiments, each of the plurality of nonvolatile memory devices 400a-400k may include a flash memory or a vertical NAND memory device. The storage controller 300 may be coupled to the plurality of nonvolatile memory devices 400a-400k through a plurality of channels CH1 to CHk, respectively.

The storage controller 300 may be configured to receive a request REQ from the host 100 and communicate data DTA with the host 100 through the signal connector 241. The storage controller 300 may write data DTA to the plurality of nonvolatile memory devices 400a-400k or read the data DTA from plurality of nonvolatile memory devices 400a-400k based on the request REQ.

The storage controller 300 may communicate the data DTA with the host 100 using the buffer memory 250 as an input/output (I/O) buffer. In some example embodiments, the buffer memory 250 may include a dynamic random access memory (DRAM).

The PMIC 270 may be configured to receive a plurality of power supply voltages (i.e., external supply voltages) VES1-VESt from the host 100 through the power connector 243. For example, the power connector 243 may include a plurality of power lines P1-Pt, and the adaptive power supply circuit 500 may be configured to receive the plurality of power supply voltages VES1-VESt from the host 100 through the plurality of power lines P-Pt, respectively. Here, t represents a positive integer greater than one.

The PMIC 270 may generate at least one first operating voltage VOP1 used by the storage controller 300, at least one second operating voltage VOP2 used by the plurality of nonvolatile memory devices 400a-400k, and at least one third operating voltage VOP3 used by the buffer memory 250 based on the plurality of power supply voltages VES1-VESt.

For example, when the PMIC 270 receives all of the plurality of power supply voltages VES1-VESt from the host 100, the PMIC 270 may generate the at least one first operating voltage VOP1, the at least one second operating voltage VOP2, and the at least one third operating voltage VOP3 using all of the plurality of power supply voltages VES1-VESt. As another example, when the PMIC 270 receives less than all of the plurality of power supply voltages VES1-VESt from the host 100, for example only some of the plurality of power supply voltages VES1-VESt, the PMIC 270 may generate the at least one first operating voltage VOP1, the at least one second operating voltage VOP2, and the at least one third operating voltage VOP3 using the some of the plurality of power supply voltages VES1-VESt that are received from the host 100.

Figure 2:
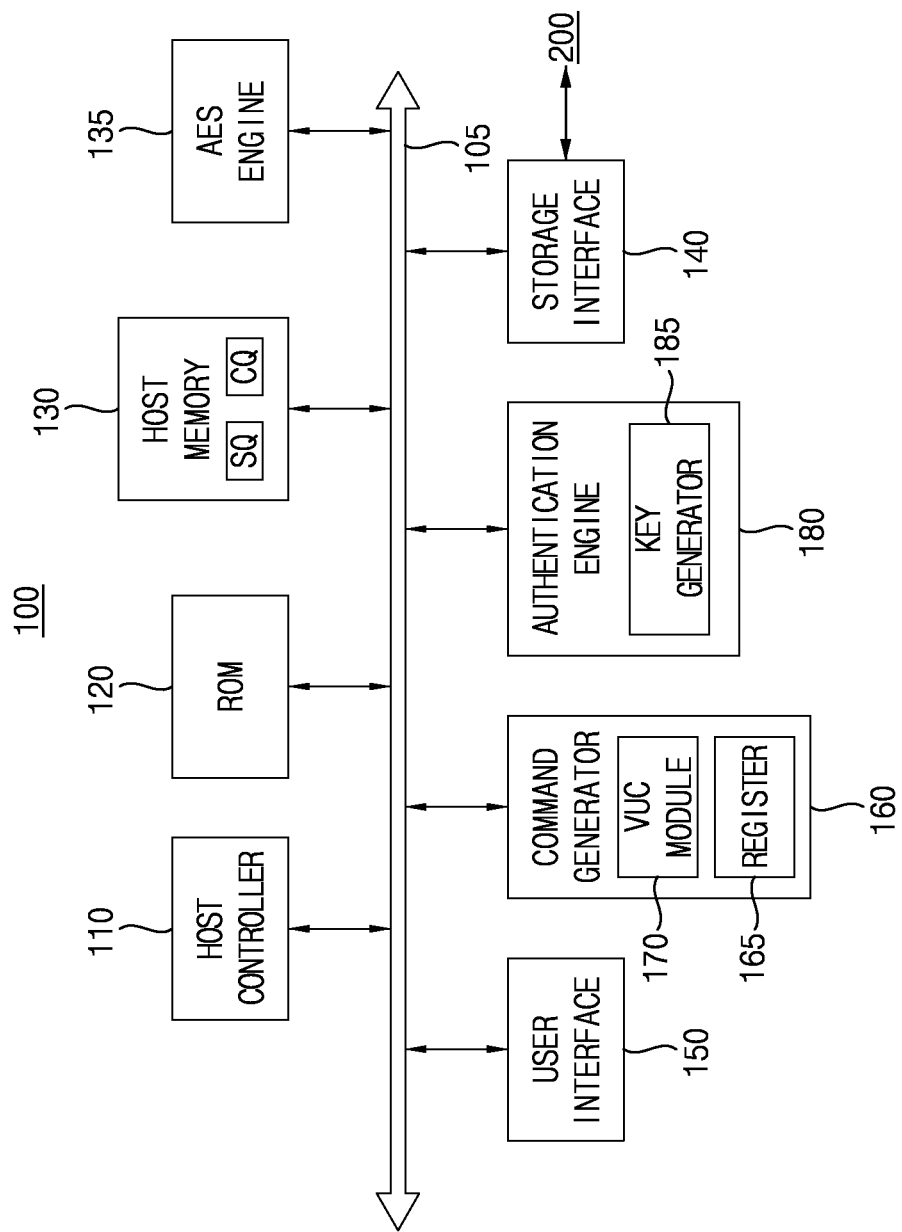
FIG. 2 is a block diagram illustrating an example of the host in FIG. 1 according to example embodiments.

FIG. 2 is a block diagram illustrating an example of the host in FIG. 1 according to example embodiments.

Referring to FIG. 2, the host 100 may include a host controller 110, a read-only memory (ROM) 120, a host memory 130, an advanced encryption standard (AES) engine 135, the storage interface 140, a user interface 150, a command generator 160, an authentication engine 180 and a bus 105.

The bus 105 may refer to a transmission channel by which data is transmitted between the host controller 110, the ROM 120, the host memory 130, the AES engine 135, the storage interface 140, the user interface 150, the command generator 160 and the authentication engine 180 of the host 100.

The ROM 120 may store various application programs. For example, application programs supporting storage protocols such as Advanced Technology Attachment (ATA), Small Computer System Interface (SCSI), embedded Multi Media Card (eMMC), and/or Universal flash storage (UFS) protocols are stored.

The host memory 130 may temporarily store data or programs. The host memory 130 may include a submission queue SQ and a completion queue CQ. The user interface 150 may be a physical or virtual medium for exchanging information between a user and the host 100, a computer program, etc., and may include physical hardware and logical software. For example, the user interface 150 may include an input device for allowing the user to manipulate the host 100, and an output device for outputting a result of processing an input of the user.

The host controller 110 may control overall operations of the host 100. The host controller 110 may generate a command for storing data in the storage device 200 or a request (or a command) for reading data from the storage device 200 by using an application stored in the ROM 120, and may transmit the request to the storage device 200 via the storage interface 140. The host controller 110 may generate the plurality of power supply voltages VES1-VESt.

The AES engine 135 may perform an encryption operation on data provided from the storage device 200 and may perform a decryption operation on data received from the storage device by using a symmetric-key algorithm.

The command generator 160 may generate a command designating an operation to be performed in the storage device 200. The command, generated by the command generator 160, may be transmitted to the storage device 200 through the storage interface 140.

The command generator 160 may generate various kinds of commands such as a read command, a write command, and an erase command. The read command may designate an operation of reading data stored in the storage device 200. The write command may designate an operation of writing data in the storage device 200. The erase command may designate an operation of physically erasing data stored in the storage device 200.

In addition, the command generator 160 may generate a vendor unique command (VUC). The command generator 160 may include a VUC module 170 and a register 165. The register 165 may store a virtual table (e.g., the virtual table V_TB in FIG. 3) received from the storage device 200. The virtual table may include (or store) random values, and each of the random values may designate a corresponding index from among indexes corresponding to a plurality of main functions. In embodiments, the virtual table may include the random values and the indexes. The VUC module 170 may select a target function from among the plurality of main functions and a plurality of sub functions associated with the plurality of main functions, respectively, based on the virtual table, may generate the VUC indicating the selected target function, and may transmit the VUC to the storage device 200 through the storage interface 140.

The authentication engine 180 may perform an authentication on the storage device 200. The authentication engine 180 may perform an authentication on the storage device 200 by exchanging a key value with the storage device 200, and may include a key generator 185 that generates the key value.

Figure 3:
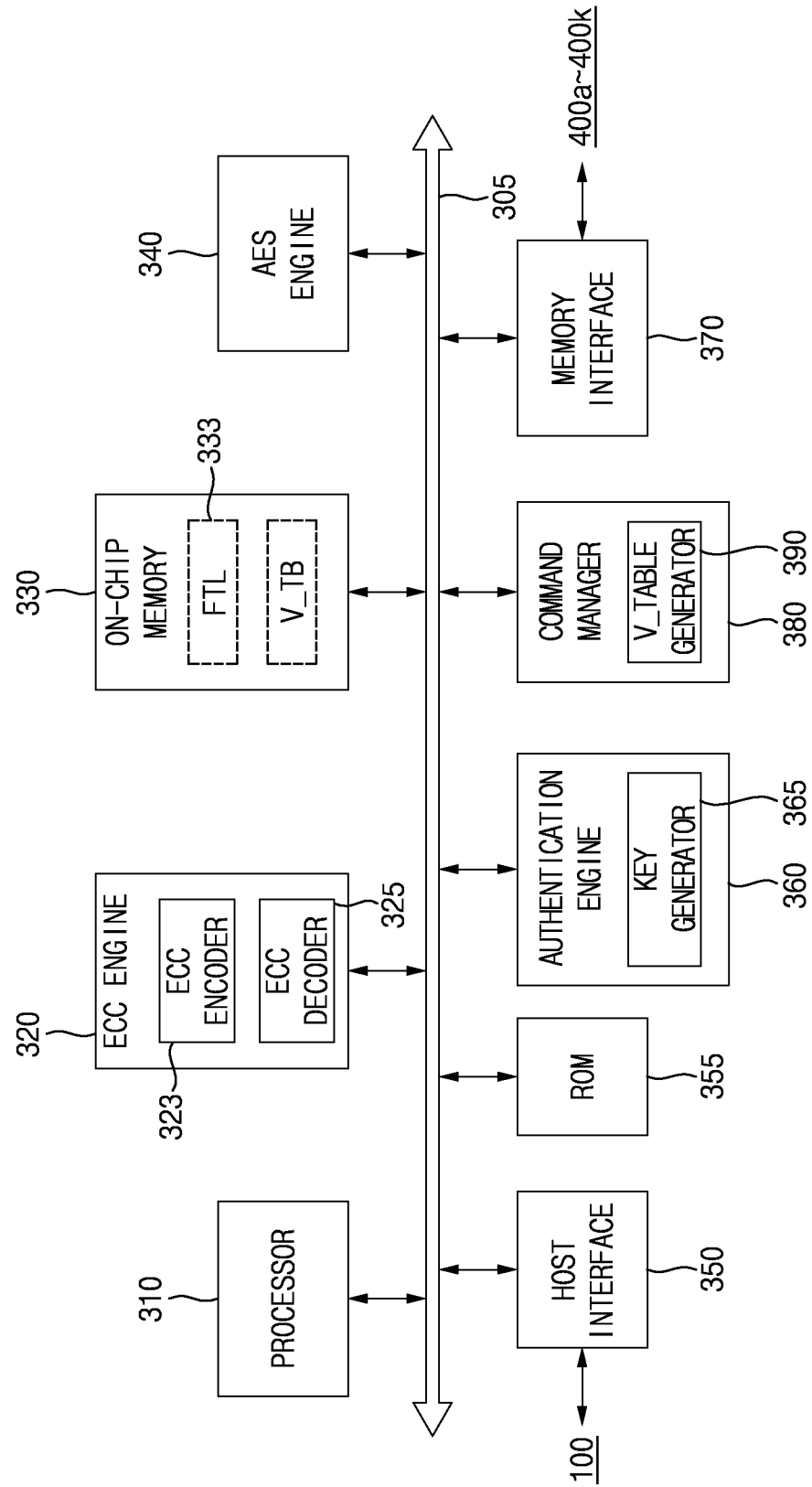
FIG. 3 is a block diagram illustrating an example of the storage controller in the storage device in FIG. 1 according to example embodiments.

FIG. 3 is a block diagram illustrating an example of the storage controller in the storage device in FIG. 1 according to example embodiments.

Referring to FIG. 3, the storage controller 300 may include a processor 310, an error correction code (ECC) engine 320, an on-chip memory 330, an AES engine 340, a host interface 350, a ROM 355, an authentication engine 360, a command manager 380 and a memory interface 370 which are connected via a bus 305.

The processor 310 controls an overall operation of the storage controller 300. The processor 310 may control the ECC engine 320, the on-chip memory 330, the AES engine 340, the host interface 350, the ROM 355, the authentication engine 360, the command manager 380 and the memory interface 370. The processor 310 may include one or more cores (e.g., a homogeneous multi-core or a heterogeneous multi-core). The processor 310 may be or include, for example, at least one of a central processing unit (CPU), an image signal processing unit (ISP), a digital signal processing unit (DSP), a graphics processing unit (GPU), a vision processing unit (VPU), and a neural processing unit (NPU). The processor 310 may execute various application programs (e.g., a flash translation layer (FTL) 333 and firmware) loaded onto the on-chip memory 330.

The on-chip memory 330 may store various application programs that are executable by the processor 310. The on-chip memory 330 may operate as a cache memory adjacent to the processor 310. The on-chip memory 330 may store a command, an address, and data to be processed by the processor 310 or may store a processing result of the processor 310. The on-chip memory 330 may be, for example, a storage medium or a working memory including a latch, a register, a static random access memory (SRAM), a dynamic random access memory (DRAM), a thyristor random access memory (TRAM), a tightly coupled memory (TCM), etc.

The processor 310 may execute the FTL 333 loaded onto the on-chip memory 330. The FTL 333 may be loaded onto the on-chip memory 330 as firmware or a program stored in the one of the nonvolatile memory devices 400a-400k. The FTL 333 may manage mapping between a logical address provided from the host 100 and a physical address of the nonvolatile memory devices 400a-400k and may include an address mapping table manager managing and updating an address mapping table. The FTL 333 may further perform a garbage collection operation, a wear leveling operation, and the like, as well as the address mapping described above. The FTL 333 may be executed by the processor 310 for addressing one or more aspects of the nonvolatile memory devices 400a-400k, for example overwrite- or in-place write-impossible, a life time of a memory cell, a limited number of program-erase (PE) cycles, and an erase speed slower than a write speed.

According to a physical characteristic of cells of the nonvolatile memory devices 400a-400k, a threshold voltage distribution may vary due to causes such as a program elapsed time, a temperature, program disturbance, read disturbance, etc. For example, data stored at the nonvolatile memory devices 400a-400k may become erroneous due to the above or similar causes.

The storage controller 300 may utilize a variety of error correction techniques to correct such errors. For example, the storage controller 300 may include the ECC engine 320. The ECC engine 320 may correct errors which occur in the data stored in the nonvolatile memory devices 400a-400k. The ECC engine 320 may include an ECC encoder 323 and an ECC decoder 325. The ECC encoder 323 may perform an ECC encoding operation on data to be stored in the nonvolatile memory devices 400a-400k. The ECC decoder 325 may perform an ECC decoding operation on data read from the nonvolatile memory devices 400a-400k.

The ROM 355 may store a variety of information, needed for the storage controller 300 to operate, in firmware.

The AES engine 340 may perform at least one of an encryption operation and a decryption operation on data input to the storage controller 300 by using a symmetric-key algorithm. In embodiments, the AES engine 340 may include an encryption module and a decryption module. For example, the encryption module and the decryption module may be implemented as separate modules. As another example, one module capable of performing both encryption and decryption operations may be implemented in the AES engine 340.

The authentication engine 360 may perform an authentication on the host 100. The authentication engine 360 may perform an authentication on the host 100 by exchanging key values with the host 100, and may include a key generator 365 that generates the key value.

The command manager 380 may manage the command received from the host 100. The command manager 380 may include a virtual table generator 390 (illustrated as V_TABLE GENERATOR) that generates the virtual table. In embodiments, the virtual table generator 390 may generate a virtual table V_TB, may transmit the virtual table V_TB to the host 100 through the host interface 350, and may store the virtual table V_TB in the on-chip memory 330. The virtual table V_TB may include (or store) random values, each of may designate a corresponding index from among indexes corresponding to a plurality of main functions, or may include the random values and the indexes.

The storage controller 300 may communicate with the host 100 through the host interface 350. For example, the host interface 350 may include interfaces such as Universal Serial Bus (USB), Multimedia Card (MMC), embedded-MMC, peripheral component interconnection (PCI), PCI-express, Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), Nonvolatile memory express (NVMe), Universal Flash Storage (UFS), and etc. The storage controller 300 may communicate with the nonvolatile memory devices 400a-400k through the memory interface 370.

Figure 4:
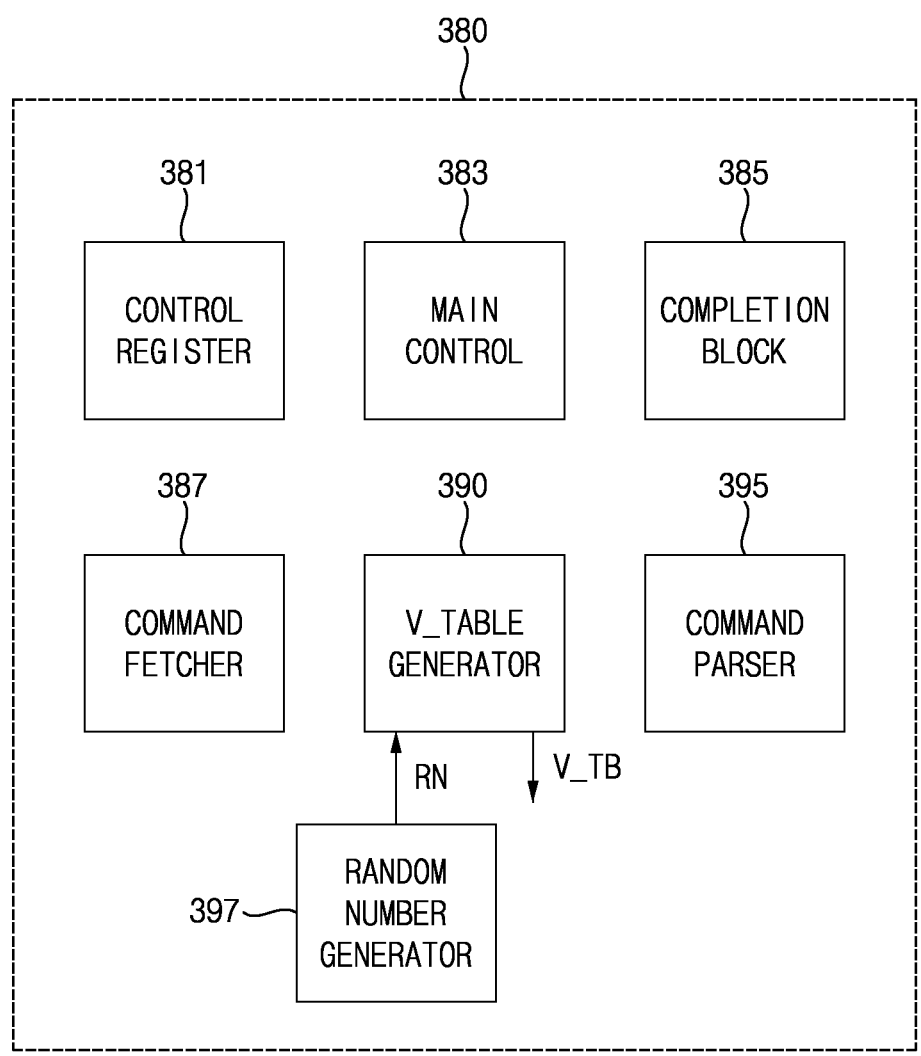
FIG. 4 is a block diagram illustrating an example of the command manager in the storage controller of FIG. 3 according to example embodiments.

FIG. 4 is a block diagram illustrating an example of the command manager in the storage controller of FIG. 3 according to example embodiments.

Referring to FIG. 4, the command manager 380 may include a control register block 381, a main control block 383, a completion block 385, a command fetch block 387, the virtual table generator 390, a command parser 395 and a random number generator 397.

The control register block 381 may be configured to include a register capable of being set by the host 100 or to process one or a series of operations for recognizing a register value set by the host 100. For example, the control register block 381 may include various registers for determining information provided from the host 100. The host 100 may notify the command manager 380 of various information by setting a register value of the control register block 381.

The command fetch block 387 may perform or process one or a series of operations for fetching a command stored in the submission queue SQ of the host 100. For example, the command fetch block 387 may transmit a memory read request to the host 100 and may receive a command stored in the submission queue SQ from the host 100.

The main control block 383 may control overall operations of the command manager 380 or may process one or a series of operations to be performed in the command manager 380.

The command parser 395 may parse the command from the host 100 and may provide the parsed command to one of the nonvolatile memory devices 400a-400k through the memory interface 370.

The completion block 385 may process one or a series of operations of writing completion information indicating that an operation is completed, to the completion queue CQ of the host 100. For example, when an operation associated with a command fetched from the host 100 is completed, the completion block 385 may write the completion information indicating that the operation is completed, to the completion queue CQ of the host 100.

The random number generator 397 may generate a random number RN, and may provide the random number RN to the virtual table generator 390. The virtual table generator 390 may generate the virtual table V_TB based on the random number RN and may transmit the virtual table V_TB to the host. The virtual table generator 390, based on the random number RN, may assign random values to the indexes corresponding to main functions that are shared by, or used in common between, the host 100 and the storage device 200, and may transmit the virtual table V_TB including the random values to the host 100. Therefore, the virtual table generator 390 may ensure security on the VUC.

Figure 5:
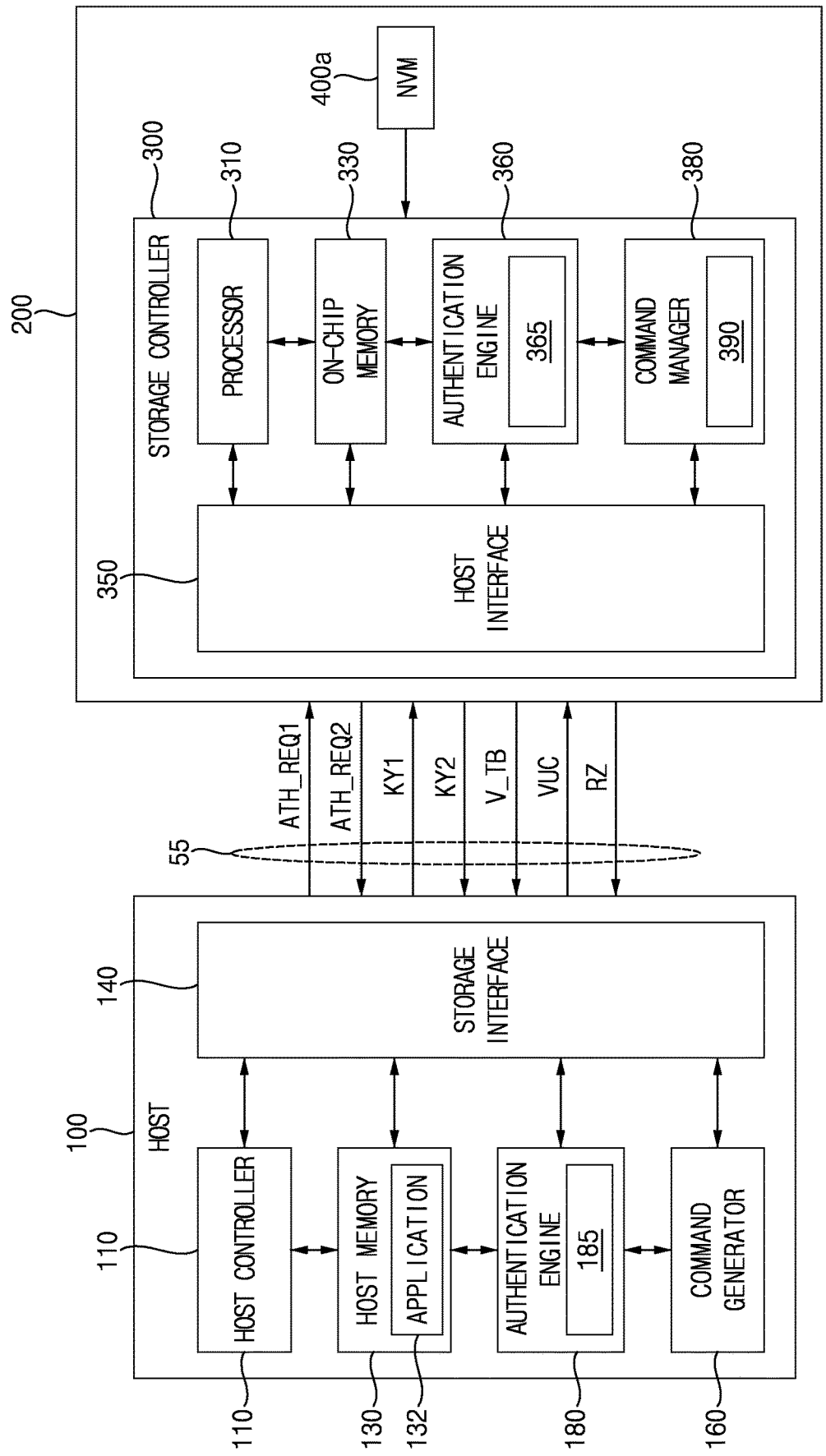
FIG. 5 illustrates the host and the storage device in detail in the storage system of FIG. 1 according to example embodiments.

FIG. 5 illustrates the host and the storage device in detail in the storage system of FIG. 1 according to example embodiments.

Referring to FIG. 5, the host 100 may include the host controller 110, the host memory 130, the authentication engine 180, the storage interface 140 and the command generator 160. The authentication engine 180 may include the key generator 185.

An application 132 may be loaded into the host memory 130. The application 132 may be, or may include, various applications that are installed in the host 100, and may access the storage device 200.

The storage device 200 may include the storage controller 300 and at least one nonvolatile memory device 400a. The storage controller 300 may include the processor 310, the on-chip memory 330, the host interface 350, the authentication engine 360, and the command manager 380. The authentication engine 360 may include the key generator 365 and the command manager 380 may include the virtual table generator 390.

When the host 100 and the storage device 200 are connected to each other through a link 55, the host controller 110 may apply an authentication request ATH_REQ1 requesting an authentication on the storage device 200 to the storage device 200, and the storage controller 300 apply an authentication request ATH_REQ2 requesting an authentication on the host 100 to the host 100.

In response to the authentication request ATH_REQ2, the key generator 185 generates a key value KY1 and transmits the key value KY1 to the storage controller 300, and, in response to the authentication request ATH_REQ1, the key generator 365 generates a key value KY2 and transmits the key value KY2 to the host 100. The authentication engine 180 performs an authentication on the storage device 200 based on comparing the key values KY1 and KY2, and the authentication engine 360 performs an authentication on the host 100 based on comparing the key values KY1 and KY2.

When the authentication on the host 100 is successful, the virtual table generator 390 in the command manager 380 generates the virtual table V_TB and transmits the virtual table V_TB to the host 100 through the host interface 350. The command generator 160 in the host 100 generates the VUC based on the virtual table V_TB and transmits the VUC to the storage controller 300 through the storage interface 140.

In example embodiments, the storage controller 300 may generate the virtual table V_TB in response to an individual request from the host 100 and may transmit the virtual table V_TB to the host 100.

In example embodiments, the storage controller 300 may perform a first authentication on the host 100, may perform a second authentication on the host 100 based on a physical security module, in response to the first authentication on the host 100 based on key values being successful, and may generate the virtual table V_TB in response to the second authentication on the host 100 being successful.

The command manager 380 parses the VUC, and the processor 310 performs an operation corresponding to the parsed VUC and transmits a result RZ of the operation to the host 100 through the host interface 350.

Therefore, the storage device 200 in the storage system 50 according to example embodiments, may generate first random values designating indexes corresponding to the main functions, respectively, and may transmit the virtual table V_TB including the first random values to the host 100. The host 100 may generate a second random value designating a target function based on the virtual table V_TB and may transmit the second random value as the VUC to the storage device 200. Accordingly, the storage device 200 and the storage system 50 may enhance security on the VUC by preventing the VUC from being exposed, for example exposed to an outside of the host 100 and the storage device 200.

In the storage system 50, authentication request and performing an authentication by exchanging key values may correspond to a session. When the authentication is successful in each of a plurality of sessions in the storage system 50, the storage device 200 generates the virtual table V_TB and transmits the virtual table V_TB to the host 100 and the host 100 generates the VUC having a random value designating a target function based on the virtual table V_TB and may transmit the VUC to the storage device 200.

Figure 6:
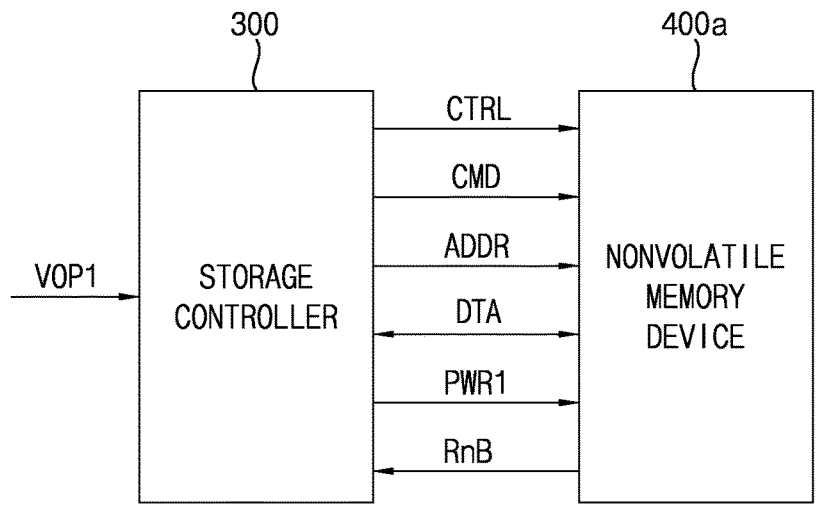
FIG. 6 is a block diagram illustrating a connection relationship between the storage controller and one nonvolatile memory device in the storage device of FIG. 1.

FIG. 6 is a block diagram illustrating a connection relationship between the storage controller and one nonvolatile memory device in the storage device of FIG. 1.

Referring to FIG. 6, the storage controller 300 may operate based on the first operating voltage VOP1.

The nonvolatile memory device 400a may perform an erase operation, a program operation, and/or a write operation under control of the storage controller 300. The nonvolatile memory device 400a may receive a command CMD, an address ADDR, and data DTA, which may be for example user data, through I/O lines from the storage controller 300 for performing such operations. In addition, the nonvolatile memory device 400a may receive a control signal CTRL through a control line and may receive a power PWR1 through a power line from the storage controller 300. In addition, the nonvolatile memory device 400a may provide the data DTA to the storage controller 300.

Figure 7:
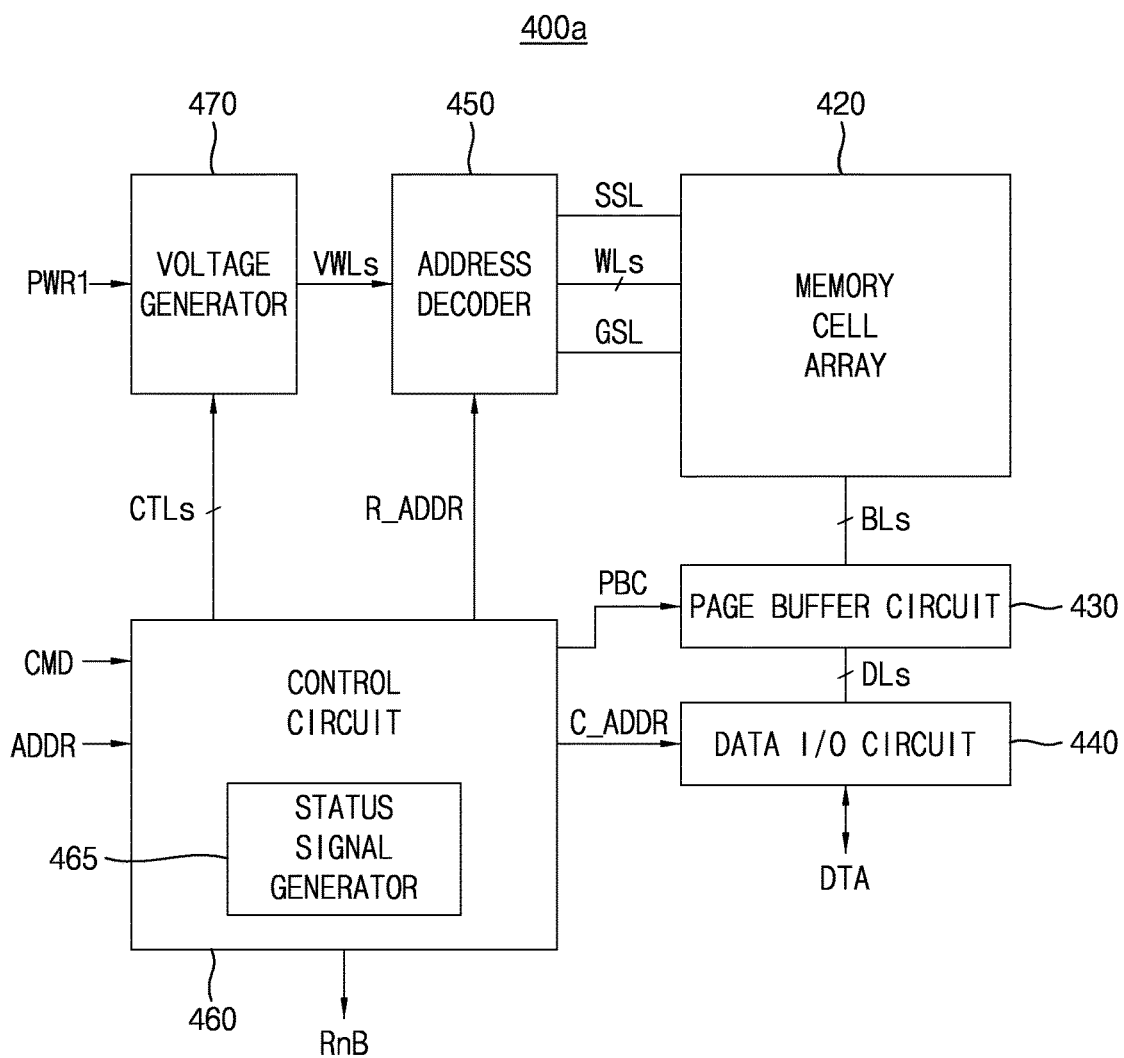
FIG. 7 is a block diagram illustrating an example of the nonvolatile memory device in FIG. 6 according to some example embodiments.

FIG. 7 is a block diagram illustrating an example of the nonvolatile memory device in FIG. 6 according to some example embodiments.

Referring to FIG. 7, the nonvolatile memory device 400a may include a memory cell array 420, an address decoder 450, a page buffer circuit 430, a data I/O circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be or include a three-dimensional memory cell array, which is formed on a substrate in a three-dimensional structure (e.g., a vertical structure). For example, the memory cell array 420 may include vertical cell strings that are vertically oriented such that at least one memory cell is located over another memory cell.

Figure 8:
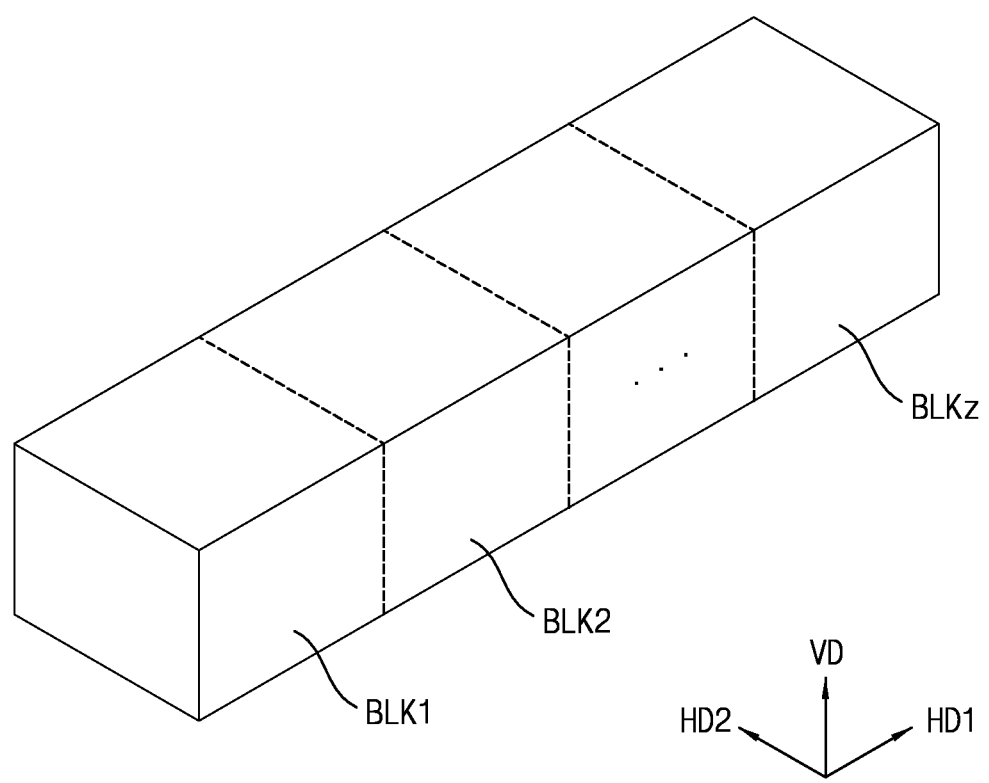
FIG. 8 is a block diagram illustrating an example of the memory cell array in the nonvolatile memory device of FIG. 7, according to example embodiments.

FIG. 8 is a block diagram illustrating an example of the memory cell array in the nonvolatile memory device of FIG. 7.

Referring to FIG. 8, the memory cell array 420 may include a plurality of memory blocks BLK1, BLK2, . . . , BLKz. The memory blocks BLK1 to BLKz extend along a first horizontal direction HD1, a second horizontal direction HD2 and a vertical direction VD. Here, z is a natural number greater than two. In some example embodiments, the memory blocks BLK1 to BLKz are selected by the address decoder 450 in FIG. 7. For example, the address decoder 450 may select a memory block BLK corresponding to a block address among the memory blocks BLK1 to BLKz.

Figure 9:
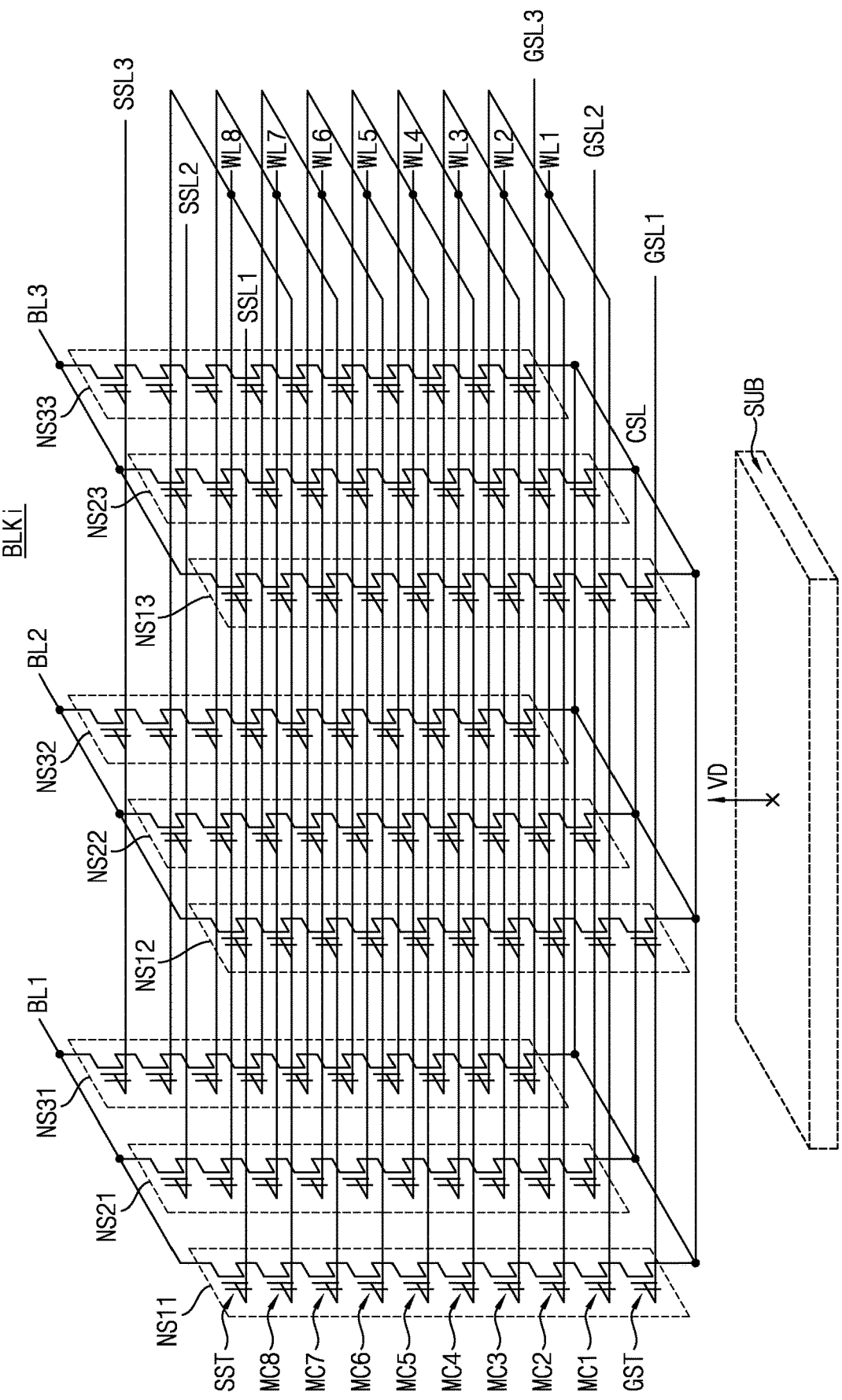
FIG. 9 is a circuit diagram illustrating one of the memory blocks of FIG. 8, according to example embodiments.

FIG. 9 is a circuit diagram illustrating one of the memory blocks of FIG. 8.

The memory block BLKi of FIG. 9, which may for example correspond to any of the memory blocks BLK1 to BLKz, may be formed on a substrate SUB in a three-dimensional structure, or for example a vertical structure. For example, a plurality of memory cell strings included in the memory block BLKi may be formed in a vertical direction VD perpendicular to the substrate SUB.

Referring to FIG. 9, the memory block BLKi may include a plurality of memory cell strings NS11, NS21, NS31, NS12, NS22, NS32, NS13, NS23 and NS33 (which may be referred to as memory cell strings NS11 to NS33) coupled between bit-lines BL1, BL2 and BL3, and a common source line CSL. Each of the memory cell strings NS11 to NS33 may include a string selection transistor SST, a plurality of memory cells MC1, MC2, MC3, MC4, MC5, MC6, MC7 and MC8 (which may be referred to as memory cells MC1 to MC8), and a ground selection transistor GST. In FIG. 9, each of the memory cell strings NS11 to NS33 is illustrated to include eight memory cells MC1 to MC8, but embodiments are not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., word-line WL1) having the same height may be commonly connected, and the ground selection lines GSL1 to GSL3 and the string selection lines SSL1 to SSL3 may be separated. In FIG. 9, the memory block BLKi is illustrated to be coupled to eight word-lines WL1 to WL8 and three bit-lines BL1 to BL3, but embodiments are not limited thereto. In some example embodiments, the memory cell array 420 may be coupled to any number of word-lines and bit-lines.

Figure 10:
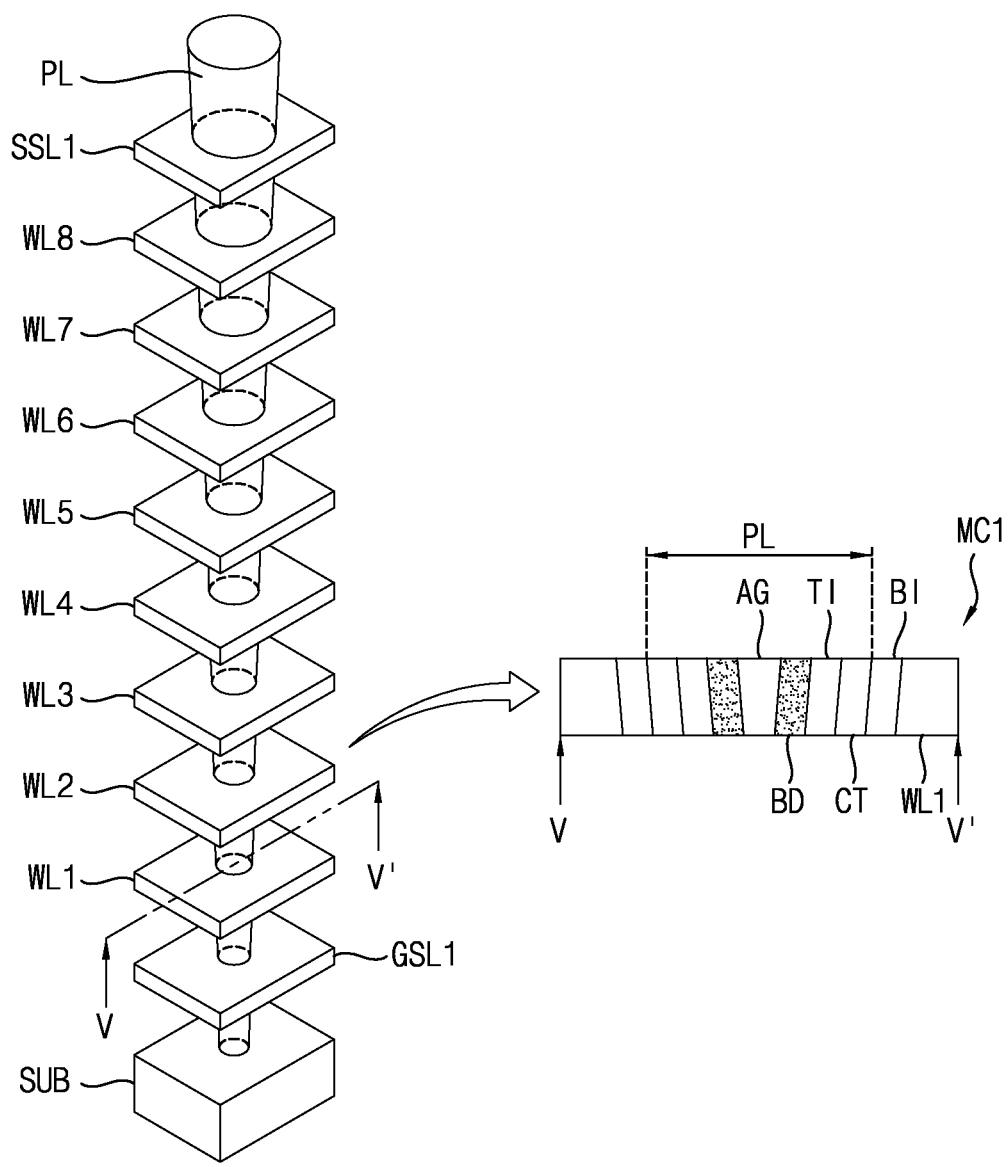
FIG. 10 illustrates an example of a structure of a cell string in the memory block of FIG. 9, according to example embodiments.

FIG. 10 illustrates an example of a structure of a memory cell string NS11 in the memory block of FIG. 9.

Referring to FIGS. 9 and 10, a pillar PL is provided on the substrate SUB such that the pillar PL extends in a direction perpendicular to the substrate SUB to make contact with the substrate SUB. Each of the ground selection line GSL, the word lines WL1 to WL8, and the string selection lines SSL1 illustrated in FIG. 10 may be formed of a conductive material parallel with the substrate SUB, for example, a metallic material. The pillar PL may be in contact with the substrate SUB through the conductive materials forming the string selection lines SSL1, the word lines WL1 to WL8, and the ground selection line GSL1.

A sectional view taken along a line V-V' is also illustrated in FIG. 10. In some example embodiments, a sectional view of a first memory cell MC1 corresponding to a first word line WL1 is illustrated. The pillar PL may include a cylindrical body BD. An air gap AG may be included in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may be included in a charge-trap-type transistor that is formed in a direction perpendicular to the substrate SUB or to an upper surface of the substrate SUB. A string selection transistor SST, a ground selection transistor GST, and other memory cells may have the same structure as the first memory cell MC1.

Referring back to FIG. 7, the control circuit 460 may receive the command CMD, or for example a signal corresponding to the command CMD, and the address ADDR, or for example a signal corresponding to the address ADDR, from the storage controller 300, and may control an erase loop, a program loop and/or a read operation of the nonvolatile memory device 400a based on the command CMD and the address ADDR. The program loop may include a program operation and a program verification operation. The erase loop may include an erase operation and an erase verification operation.

For example, the control circuit 460 may generate control signals CTLs, which are used for controlling the voltage generator 470, may generate a page buffer control signal PBC for controlling the page buffer circuit 430 based on the command CMD, may provide the control signals CTLs to the voltage generator 470 and may provide the page buffer control signal PBC to the page buffer circuit 430. In addition, the control circuit 460 may generate a row address R_ADDR and a column address C_ADDR based on the address signal ADDR. The control circuit 460 may provide the row address R_ADDR to the address decoder 450 and may provide the column address C_ADDR to the data I/O circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (e.g., a selected word-line) and determine rest of the plurality of word-lines WLs except for the first word-line as unselected word-lines based on the row address R_ADDR.

The voltage generator 470 may generate word-line voltages VWLs, which are required for the operation of the nonvolatile memory device 400a, based on the control signals CTLs. The voltage generator 470 may receive the power PWR1 from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to all word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

Furthermore, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In some example embodiments, one page buffer may be connected to two or more bit-lines.

The page buffer circuit 430 may temporarily store data to be programmed in a selected page or data read out from the selected page.

The data I/O circuit 440 may be coupled to the page buffer circuit 430 through data lines DLs. During the program operation, the data I/O circuit 440 may receive the data DTA from the storage controller 300 provide the data DTA to the page buffer circuit 430 based on the column address C_ADDR received from the control circuit 460.

During the read operation, the data I/O circuit 440 may provide the data DTA which are stored in the page buffer circuit 430, to the storage controller 300 based on the column address C_ADDR received from the control circuit 460.

The control circuit 460 may control the page buffer circuit 430 and data I/O circuit 440.

The control circuit 460 may include a status signal generator 465 and the status signal generator 465 may generate a status signal RnB indicating whether each of the program operation, the erase operation and the read operation is completed and/or is in progress.

The storage controller 300 may determine idle state or busy state of each of the nonvolatile memory devices 400a-400k based on the status signal RnB.

Figure 11:
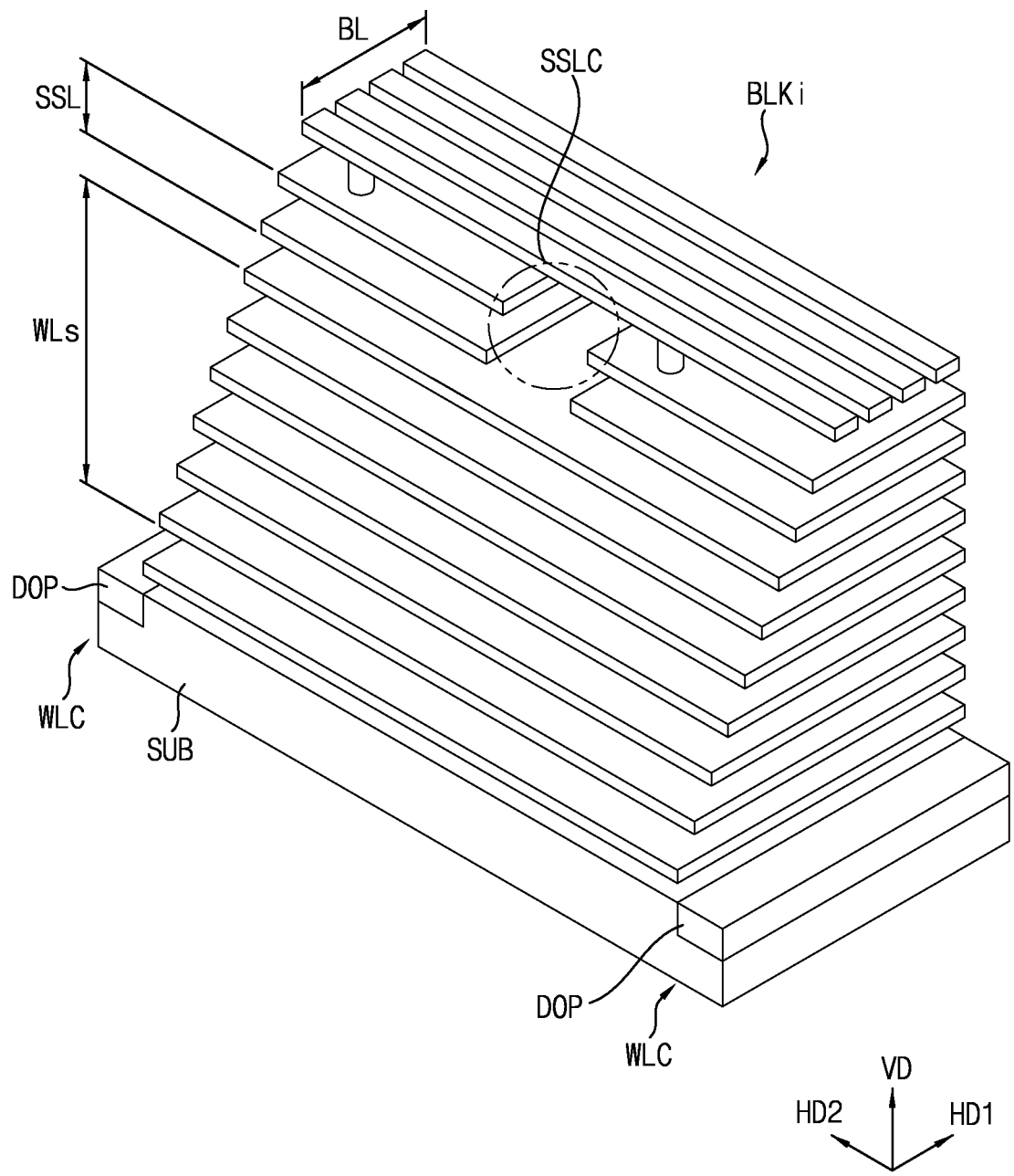
FIG. 11 is a perspective view illustrating one of the memory blocks in FIG. 8, according to example embodiments.

FIG. 11 is a perspective view illustrating one of the memory blocks in FIG. 8.

Referring to FIG. 11, the memory block BLKi may be implemented such that at least one ground selection line GSL, a plurality of word-lines WLs and at least one string selection line SSL are stacked on a substrate between word-line cut regions WLC. Doping regions DOP may be formed in top portions of the substrate of the word-line cut regions WLC. The doping region may be used as common source lines CSL or common source nodes CSN to which a common source voltage is applied. The at least one string selection line SSL may be divided by a string selection line cut region SSLC extending in the first horizontal direction HD1.

A plurality of vertical channels or channel holes penetrate the at least one ground selection lines GSL, the plurality of word-lines WLs and the at least one string selection lines SSL. The at least one ground selection lines GSL, the plurality of word-lines WL and the at least one string selection lines SSL may be formed in the shape of planks. Bit-lines BL are connected to top surfaces of the channel holes.

Figure 12A:
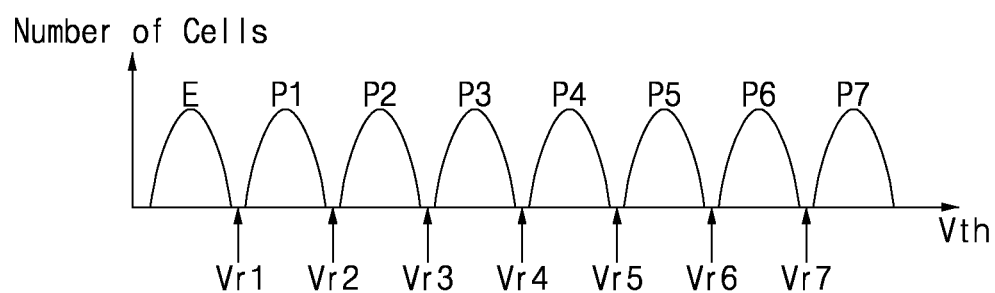
FIG. 12A is a graph showing a threshold voltage distribution of memory cells when a memory cell included in the memory cell array in FIG. 7 is a 3-bit triple level cell (TLC), according to example embodiments.

FIG. 12A is a graph showing a threshold voltage distribution of memory cells when a memory cell included in the memory cell array in FIG. 7 is a 3-bit triple level cell (TLC).

Referring to FIG. 12A, a horizontal axis represents a threshold voltage Vth and the vertical axis represents the number of memory cells. When each of the memory cells is a 3-bit triple level cell programmed to store 3 bits, the memory cell may have one from among an erase state E and first through seventh program states P1 through P7. When a memory cell is a triple level cell, unlike a single-level cell, because an interval between threshold voltages distributions is small, a relatively small change in the threshold voltage Vth may cause a relatively large problem, for example an erroneous operation corresponding to the memory cell.

A first read voltage Vr1 has a voltage level between a distribution of a memory cell having the erase state E and a distribution of a memory cell having the first program state P1. Each of second through seventh read voltages Vr2 through Vr7 have a voltage level between distributions of memory cells having adjacent program states.

In example embodiments, based on the first read voltage Vr1 bring applied, when a memory cell is turned on, data '1' may be stored, and when the memory cell is turned off, data '0' may be stored. However, embodiments are not limited thereto. For example, in embodiments, based on the first read voltage Vr1 being applied, when a memory cell is turned on, data '0' may be stored, and when the memory cell is turned off, data '1' may be stored. As such, a logic level of data may vary according to embodiments.

Figure 12B:
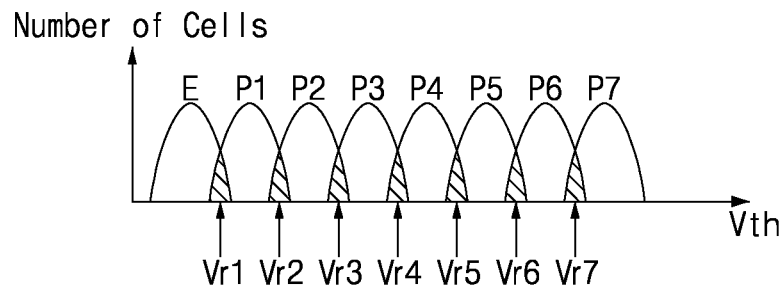
FIG. 12B is a graph showing cases where a threshold voltage of memory cells in the graph of FIG. 12A is changed, according to example embodiments.

FIG. 12B is a graph showing cases where a threshold voltage of memory cells in the graph of FIG. 12A is changed.

Referring to FIG. 12B, memory cells respectively programmed to the erase state E and the first through seventh program states P1 through P7 may have a changed distribution as shown in FIG. 12B according to a read environment. In FIG. 12B, memory cells belonging to portions shown with hatchings may have read errors, thereby reducing the reliability of a nonvolatile memory device.

For example, when a read operation is performed on a memory device by using the first read voltage Vr1, although memory cells included in a hatched portion are programmed to the first program state P1, the memory cells may be determined to have the erase state E due to a decrease in the threshold voltage Vth. Accordingly, an error may occur in the read operation, thereby reducing the reliability of the nonvolatile memory device.

When data is read from the nonvolatile memory device 400a, a raw bit error rate (RBER) may vary according to a voltage level of a read voltage. An optimum or desirable voltage level of a read voltage maybe determined according to a distribution pattern of the memory cells. Accordingly, as a distribution of the memory cells changes, an optimum or desirable voltage level of a read voltage used to read data from the nonvolatile memory device may change.

Figures 13, 14:
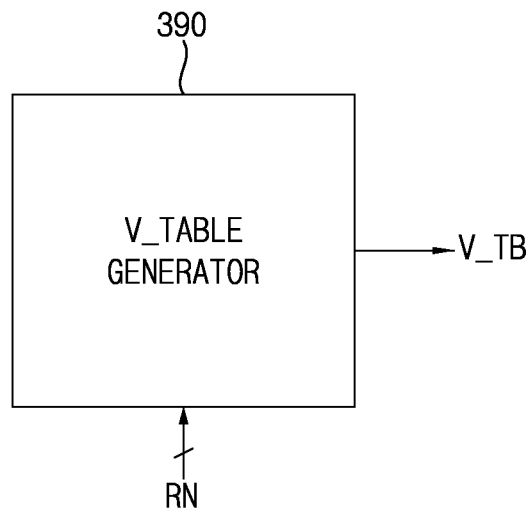
FIG. 13 illustrates an example of the virtual table generator according to example embodiments.
FIG. 14 illustrates an example of the virtual table according to example embodiments.

FIG. 13 illustrates an example of the virtual table generator according to example embodiments.

Referring FIG. 13, the virtual table generator 390 may generate the virtual table V_TB based on at least one random number RN.

As mentioned above, the virtual table V_TB may include random values designating indexes corresponding to the main functions, respectively and the storage device 200 may prevent the VUC from being exposed by transmitting the random values to the host 100.

FIG. 14 illustrates an example of the virtual table according to example embodiments.

Referring to FIG. 14, the virtual table V_TB may include random values designating indexes IDX[0, 1, 2, 3] corresponding to the main functions. In example embodiments, the virtual table V_TB may include the indexes IDX[0, 1, 2, 3] and random values RNV.

In the example illustrated in FIG. 14, the random value RNV designating the IDX[0] is '0x84548302', the random value RNV designating the IDX[1] is '0x45328302', the random value RNV designating the IDX[2] is '0x23403941', and the random value RNV designating the IDX[3] is '0x59642034'. In each of the random values '0x84548302', '0x45328302', '0x23403941' and '0x59642034', the prefix '0x' denotes that each of the random values '0x84548302', '0x45328302', '0x23403941' and '0x59642034' is a hexadecimal number.

Accordingly, the IDX[0] may be designated by the hexadecimal random value '84548302', the IDX[1] may be designated by the hexadecimal random value '45328302', the IDX[2] may be designated by the hexadecimal random value '23403941', and the IDX[3] may be designated by the hexadecimal random value '59642034'.

The indexes IDX[0, 1, 2, 3] and the main functions designated by the indexes IDX[0, 1, 2, 3] may be shared by, or used in common between, the host 100 and the storage device 200, and entries of the virtual table V_TB may designate the indexes IDX[0, 1, 2, 3] in order.

FIG. 15 illustrates one of the random values in FIG. 14 according to example embodiments.

Referring to FIG. 15, a random value RNVa corresponding to '0x84548302' may include a plurality of sub-fields SF1, SF2 and SF3. In '0x84548302', '8454' corresponds to a first sub-field SF1, '83' corresponds to a second sub-field SF2 and '02' corresponds to a third sub-field SF3. In embodiments, each of the random values '0x84548302', '0x45328302', '0x23403941' and '0x59642034' in FIG. 14 may include the first sub-field SF1, the second sub-field SF2 and the third sub-field SF3.

The first sub-field SF1, the second sub-field SF2 and the third sub-field SF3 may respectively correspond to a first sub-parameter, a second sub-parameter and a third sub-parameter of each of the main functions designated by the indexes IDX[0, 1, 2, 3].

Because the first sub-field SF1 in FIG. 15 may be used for identifying a corresponding index, the virtual table generator 390 generates the random values '0x84548302', '0x45328302', '0x23403941' and '0x59642034' such that the first sub-fields SF1 of the random values '0x84548302', '0x45328302', '0x23403941' and '0x59642034' do not overlap, based on the random value RN when generating the virtual table V_TB.

FIG. 16 illustrates a function table representing the indexes and the main functions shared by the host and the storage device according to example embodiments.

Referring to FIG. 16, a function table F_TB may represent a mapping relationship between an index IDX and a main function FUNC designated by the index IDX.

In the example illustrated in FIG. 16, The IDX[0] may be mapped to a main function FUNC0, the IDX[1] may be mapped to a main function FUNC1, the IDX[2] may be mapped to a main function FUNC2, and the IDX[3] may be mapped to a main function FUNC3. The mapping relationship between the index IDX and the main function FUNC may be shared by the host 100 and the storage device 200.

FIG. 17A illustrates a virtual table generated by the virtual table generator based on main functions and sub functions according to example embodiments.

table TB1 in FIG. 17A shows relationships between indexes, arguments, main functions, sub-functions, and random values. For example, the Table TB1 shows the indexes IDX[0, 1, 2, 3] corresponding to main functions FUNC0_0_0, FUNC1, FUNC2_0_0 and FUNC3. In addition, the table TB1 shows sub-parameters ARG[3:2], ARG[1] and ARG[0] of the main functions FUNC0_0_0, FUNC1, FUNC2_0_0 and FUNC3 Further, the table TB1 shows the main functions FUNC0_0_0, FUNC1, FUNC2_0_0 and FUNC3. Still further, the table TB1 shows sub-functions FUNC0_0_1, FUNC0_0_2, FUNC0_0_3, FUNC0_1, FUNC0_2_0 and FUNC0_2_1 associated with the main function FUNC0_0_0, and a sub function FUNC2_1_0 associated with the main function FUNC2_0_0.

In addition, the table TB1 shows the random value '0x84548302' associated with the main function FUNC0_0_0, and random values '0x84548303', '0x84548304', '0x84548305', '0x84548402', '0x84548502' and '0x84548503' respectively associated with the sub functions FUNC0_0_1, FUNC0_0_2, FUNC0_0_3, FUNC0_1, FUNC0_2_0 and FUNC0_2_1 of the main function FUNC0_0_0. Further, the table TB1 shows the random value '0x45328302' associated with the main function FUNC1. Still further, the table TB1 shows the random value '0x23403941' associated with the main function FUNC2_0_0, a random value '0x23403A41' associated with the sub function FUNC2_1_0 of the main function FUNC2_0_0, and the random value '0x59642034' associated with the main function FUNC3.

The virtual table generator 390 in FIG. 13 may generate the virtual table V_TB including the random values '0x84548302', '0x45328302', '0x23403941' and '0x59642034' in FIG. 17A and may transmit the virtual table V_TB to the host 100. The virtual table generator 390 may generate the random values '0x84548302', '0x45328302', '0x23403941' and '0x59642034' such that the first sub-fields SF1 of the random values '0x84548302', '0x45328302', '0x23403941' and '0x59642034' are non-overlapped.

Figure 17B:
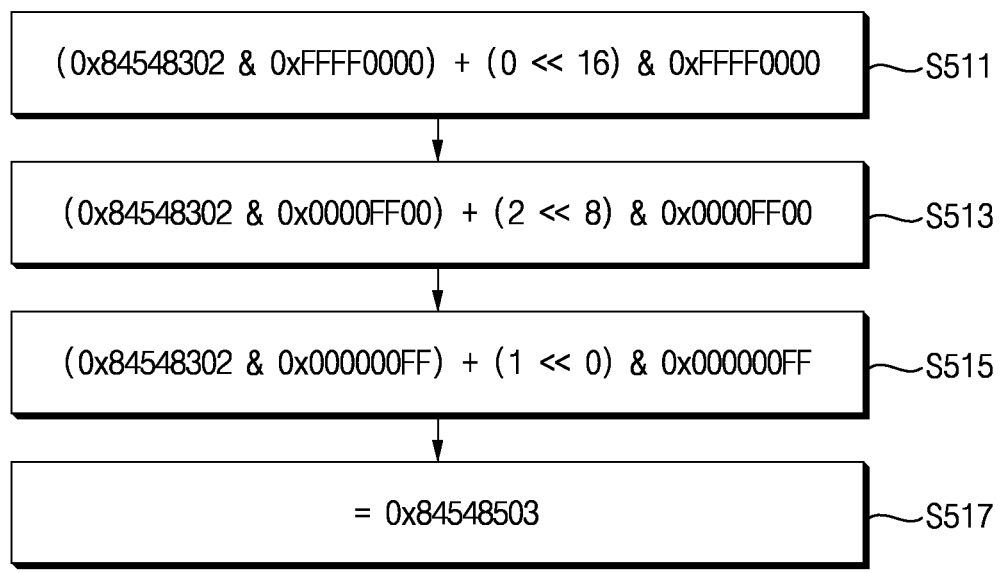
FIG. 17B illustrates that the host generates the VUC based on the virtual table according to example embodiments.

FIG. 17B illustrates a process of generating a VUC by the host based on the virtual table according to example embodiments.

A table TB2 in FIG. 17B illustrates an example of the VUC module 170 in the command generator 160 in the host 100 of FIG. 2 selecting the sub-function FUNC0_2_1 of the main function FUNC0_0_0 as a target function, and generating a random value for calling the target function based on the virtual table V_TB including the random values '0x84548302', '0x45328302', '0x23403941' and '0x59642034' for the main functions FUNC0_0_0, FUNC1, FUNC2_0_0 and FUNC3.

Referring to FIG. 17B, the VUC module 170 may generate '0x84540000' by applying a first mask pattern '0xFFFF000' (where the symbol '&' denotes a masking) to the random value '0x84548302' of the first main function FUNC0_0_0 because a first sub parameter of the sub function FUNC0_2_1 is '0' at operation S511. At operation S513, the VUC module 170 may generate '0x00008300' by applying a second mask pattern '0x0000FF00' to the random value '0x84548302' of the first main function FUNC0_0_0, and generate '0x00008500' by adding '0x0000020' to '0x00008300' because a second sub parameter of the sub function FUNC0_2_1 is '2'. At operation S515, the VUC module 170 may generate '0x00000002' by applying a third mask pattern '0x000000FF' to the random value '0x84548302' of the first main function FUNC0_0_0, generate '0x00000003' by adding '0x00000001' to '0x00000002' because a third sub parameter of the sub function FUNC0_2_1 is '1'. At operation S517 the VUC module 170 may finally obtain '0x84548503' by adding the results '0x84540000', '0x00008500' and '0x00000003' generated at the previous operations. As shown in FIG. 17B, the obtained value '0x84548503' may match a random value of the sub function FUNC0_2_1 in FIG. 17A.

Although the main functions, the sub functions, and the VUC are described as including 32-bit (e.g., 4-byte) values with reference to FIGS. 14 through 17B, embodiments are not limited thereto. For example, in embodiments the main functions, the sub functions and the VUC may include values having various bit lengths, such as 64-bit (e.g., 8-byte) values. Therefore, sub-parameters may be implemented variously based on a size of each of the main functions, and sub-fields of the random values may be implemented variously based on a size of each of the main functions.

In embodiments, the VUC module 170 may discard a carry value when the carry value is present in a result of the adding process.

The command generator 160 may transmit '0x84548503' as the VUC to the storage device 200, the storage controller 300 may parse the VUC and may perform an operation corresponding to the VUC by calling the sub function FUNC0_2_1.

Figure 18A:
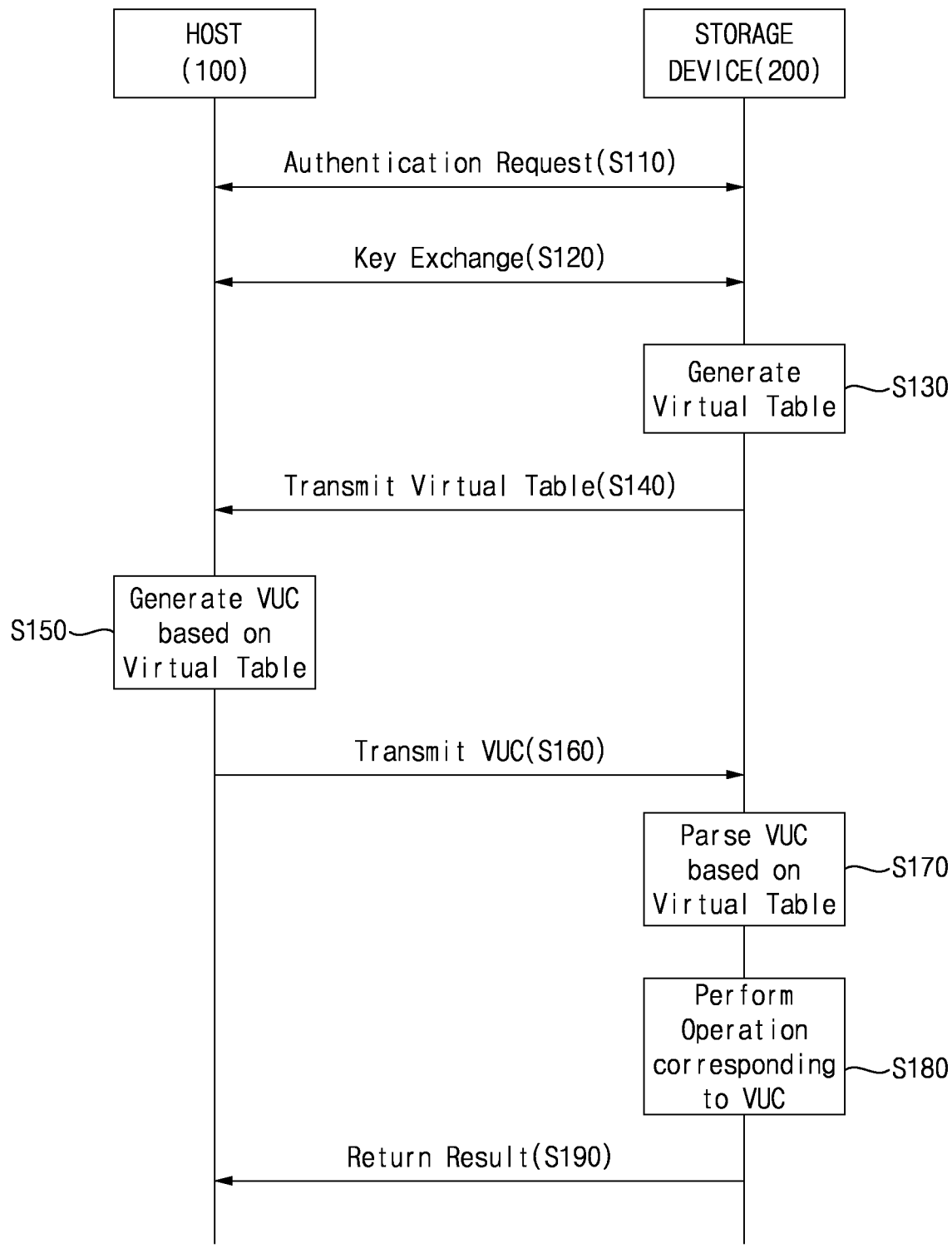
FIG. 18A illustrates an example method of operating a storage device according to example embodiments.

FIG. 18A illustrates an example method of operating a storage device according to example embodiments.

Referring to FIGS. 2 through 5 and 13 through 18A, when a connection is established between a host 100 and a storage device 200 in a storage system 50, the host 100 and the storage device 200 request authentication on each other at operation S110.

Each of the host 100 and the storage device 200 performs an authentication on each other by exchanging key values at operation S120. Based on the authentication being successful, the virtual table generator 390 in the storage device 200 generates a virtual table V_TB including random values designating indexes corresponding to main functions at operation S130, and the storage controller 300 in the storage device 200 transmits the virtual table V_TB to the host 100 through a host interface 350 at operation S140.

The host 100 receives the virtual table V_TB, and a command generator 160 in the host 100 generates a VUC having a random value designating a target function from among the main functions and sub functions based on the virtual table V_TB at operation S150, and the host 100 transmits the VUC to the storage device 200 through a storage interface 140 at operation S160.

A command manager 380 in the storage device 200 parses the VUC based on the virtual table V_TB at operation S170. The storage controller 300 performs an operation corresponding to the parsed VUC at operation S180 and transmits a result of the operation to the host 100 at operation S190.

Figure 18B:
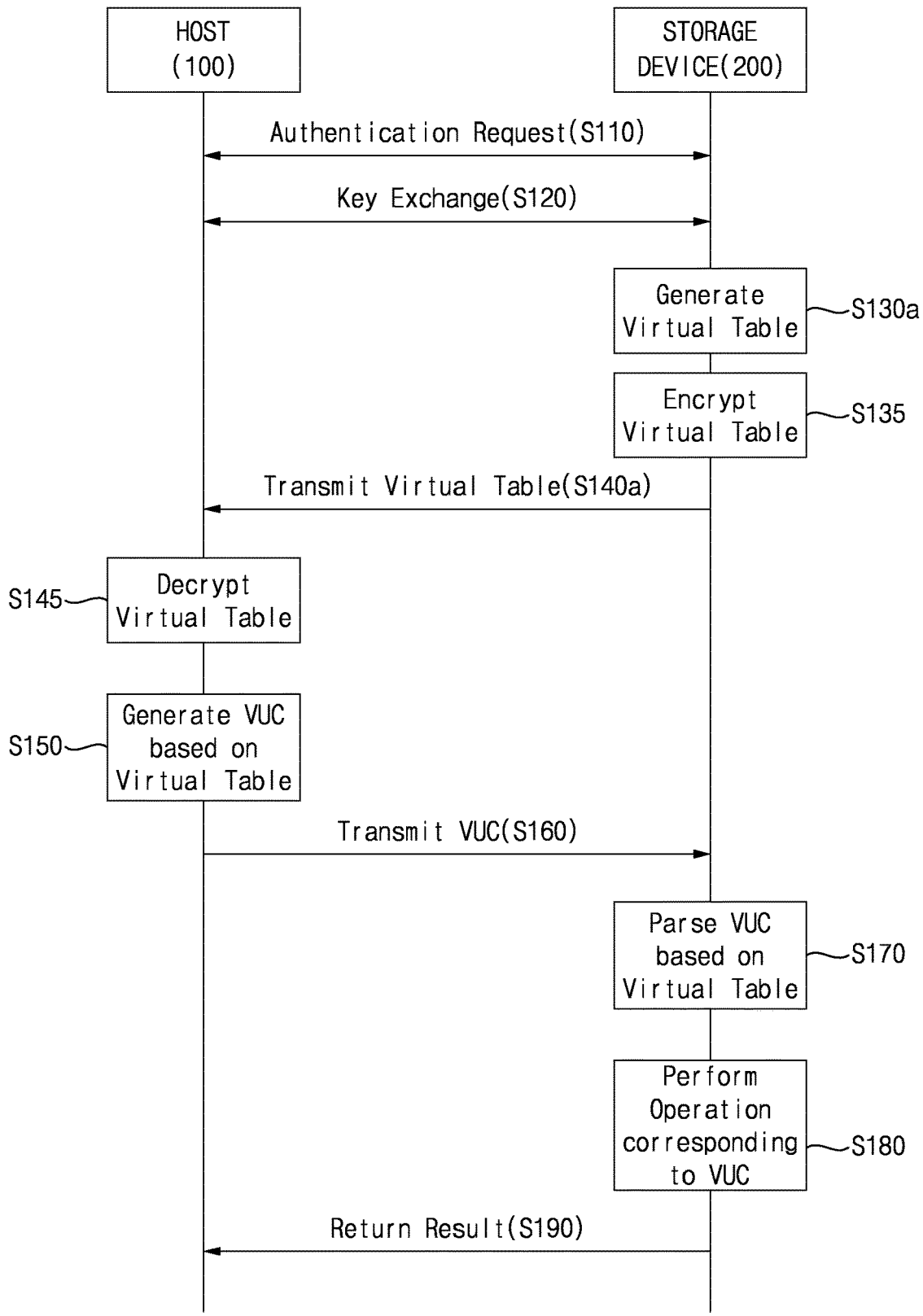
FIG. 18B illustrates an example method of operating a storage device according to example embodiments.

FIG. 18B illustrates an example method of operating a storage device according to example embodiments. In embodiments, the example method of FIG. 18B may be similar to the example method of FIG. 18A, except that the additional operations S135 and S145 may be performed along with modified operations S130a and S140a.

Referring to FIGS. 2 through 5, 13 through 17 and 18B, when a connection is established between a host 100 and a storage device 200 in a storage system 50, the host 100 and the storage device 200 request authentication on each other at operation S110.

The host 100 and the storage device 200 performs an authentication on each other by exchanging key values at operation S120. In response to the authentication being successful, the virtual table generator 390 in the storage device 200 generates a virtual table V_TB including random values designating indexes corresponding to main functions at operation S130a, encrypts the generated virtual table V_TB at operation S135, and the storage controller 300 in the storage device 200 transmits the encrypted virtual table V_TB to the host 100 through a host interface 350 at operation S140a.

The host 100 receives the encrypted virtual table V_TB and decrypts the encrypted virtual table V_TB at operation S145. A command generator 160 in the host 100 generates a VUC having a random value designating a target function from among the main functions and sub functions based on the virtual table V_TB at operation S150, and the host 100 transmits the VUC to the storage device 200 through a storage interface 140 at operation S160.

A command manager 380 in the storage device 200 parses the VUC based on the virtual table V_TB at operation S170. The storage controller 300 performs an operation corresponding to the parsed VUC at operation S180 and transmits a result of the operation to the host 100 at operation S190.

A valid time interval of the virtual table V_TB shared by the host 100 and the storage device 200 may correspond to a time interval during which the host 100 and the storage device 200 communicate to each other after a connection is established between the host 100 and the storage device 200. The storage device 200 may generate a new virtual table V_TB and transmit the new virtual table V_TB to the host 100 periodically, or based on an occurrence of an event from an outside of the storage device 200 after a connection is established between the storage device 200 and the host 100.

Therefore, in the storage system 50 according to example embodiments, the storage device 200 transmits the virtual table V_TB including first random values designating the indexes corresponding to the main functions to the authenticated host 100, and the host 100 generates the VUC having a second random value designating a target function and transmits the VUC to the storage device 200. Accordingly, the storage system 50 may prevent contents of the VUC from being exposed and thus ensure security of the VUC.

Figure 19:
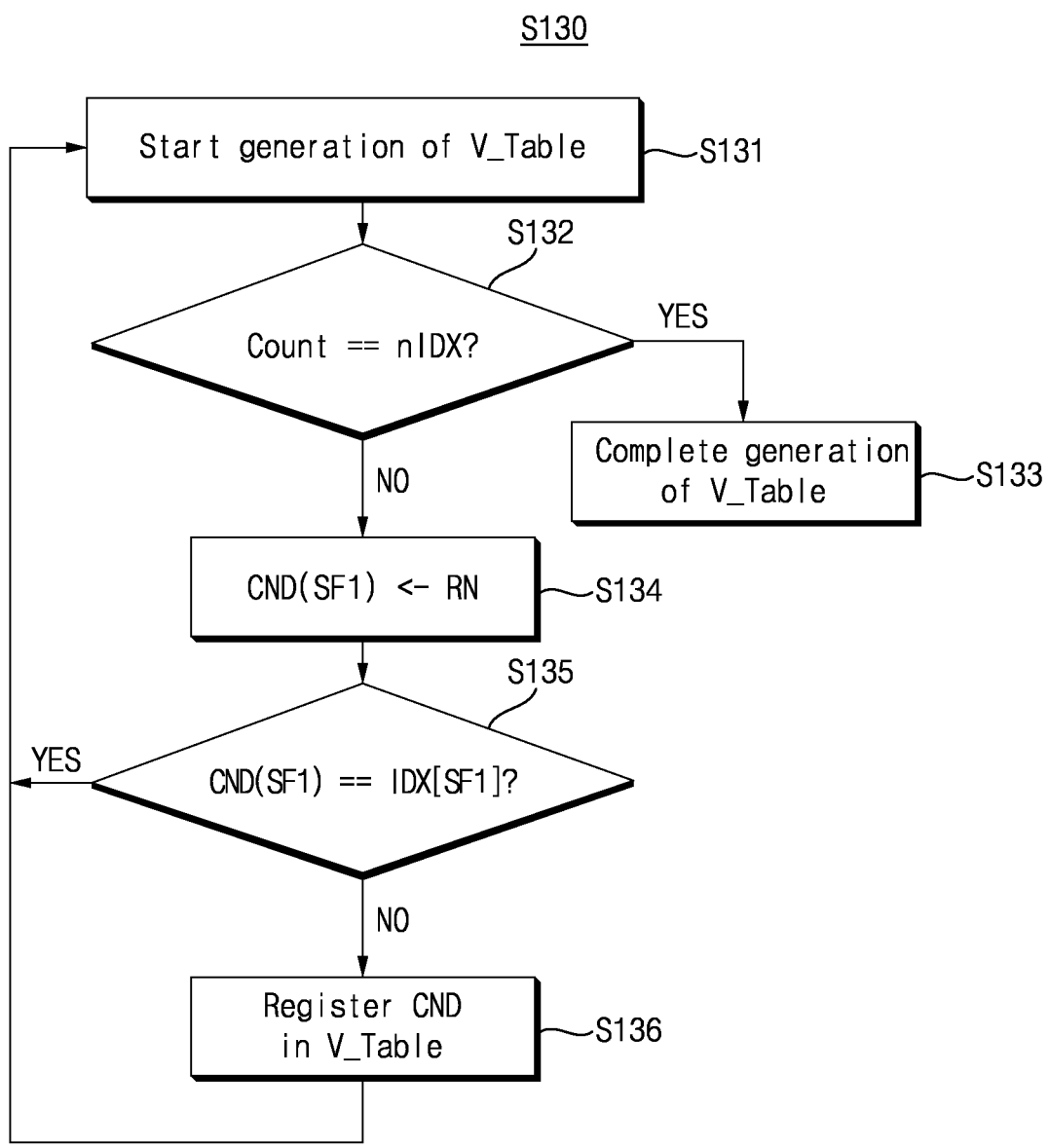
FIG. 19 is a flow chart illustrating an operation of generating the virtual table in FIGS. 18A and 18B, according to example embodiments.

FIG. 19 is a flow chart illustrating an operation of generating the virtual table in FIGS. 18A and 18B.

Referring to FIG. 19, for generating the virtual table V_TB at operation S130, the virtual table generator 390 starts generation of the virtual table V_TB at operation S131. The virtual table generator 390 determines whether a count of entries of the virtual table V_TB is the same as the number nIDX of the indexes at operation S132.

When the count of entries of the virtual table V_TB is the same as the number nIDX of the indexes (YES at operation S132, the virtual table generator 390 completes generation of the virtual table V_TB at operation S133. When the count of entries of the virtual table V_TB is not the same as the number nIDX of the indexes (NO at operation S132, the virtual table generator 390 generates candidates CND of the random values based on a random value RN at operation S134.

The virtual table generator 390 determines whether a first sub-field CND (SF1) of the candidate CND matches first sub-fields IDX[SF1] of previous indexes that are pre-stored in the virtual table V_TB at operation S135. When the first sub-field CND (SF1) of the candidate CND matches one of the first sub-fields IDX[SF1] (YES at operation S135, the virtual table generator 390 returns to operation S131. When the first sub-field CND (SF1) of the candidate CND does not match each of the first sub-fields IDX[SF1] (NO at operation S135, the virtual table generator 390 registers the candidate CND in the virtual table V_TB at operation S136, and returns to operation S131. That is, the virtual table generator 390 may generate candidates of the random values as many as the number of the first sub-fields based on the random number and may store the candidates of the random values in the virtual table V_TB in response to the candidates of the random values not matching previous random values that are pre-stored in the virtual table V_TB.

Figure 20:
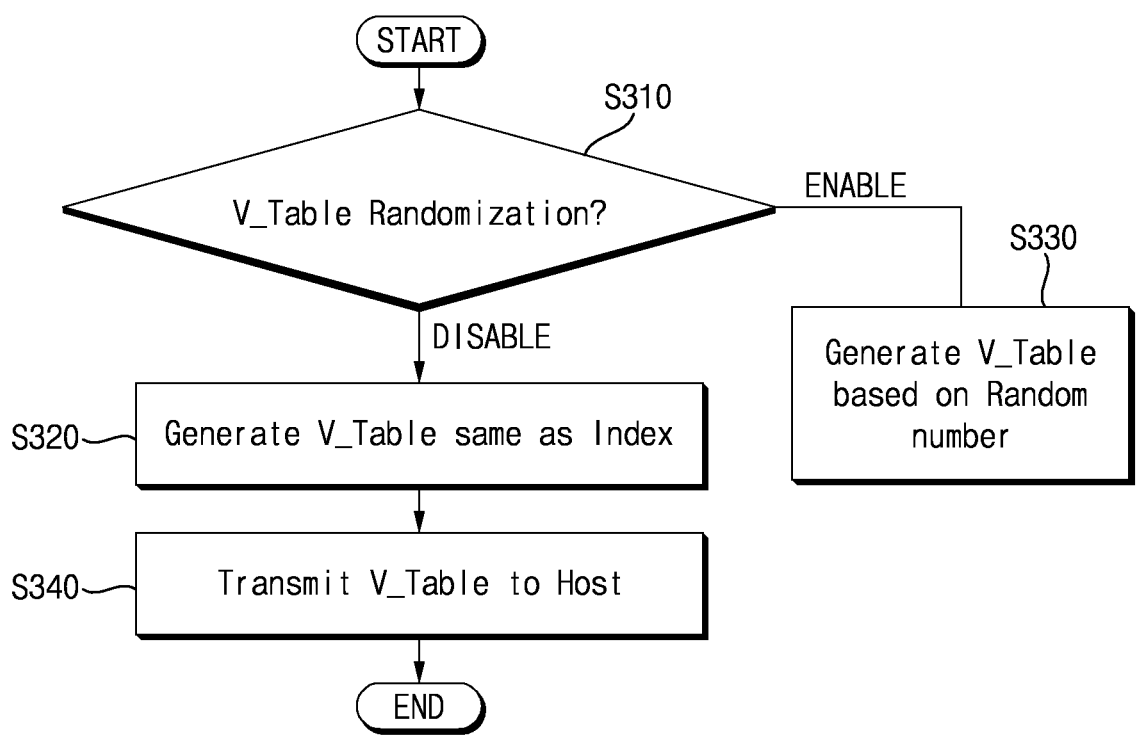
FIG. 20 is a flow chart illustrating an operation of the virtual table generator according to example embodiments.

FIG. 20 is a flow chart illustrating an operation of the virtual table generator according to example embodiments.

Referring to FIGS. 13 and 20, it is determined, for example by a vendor, whether to enable randomization of the virtual table V_TB at operation S310. For example, when a current stage is a development stage of the storage device 200, randomization of the virtual table V_TB may be disabled (DISABLE in S310), and the virtual table generator 390 may generate the virtual table V_TB having same values as the indexes at operation S320 and the storage controller 300 may transmit the virtual table V_TB to the host at operation S340.

As another example, when a current stage is a mass production stage of the storage device 200, randomization of the virtual table V_TB may be enabled (ENABLE in S310), the virtual table generator 390 may generate the virtual table V_TB including random values designating the indexes based on the random value at operation S330 and the storage controller 300 may transmit the virtual table V_TB to the host at operation S340.

Figure 21:
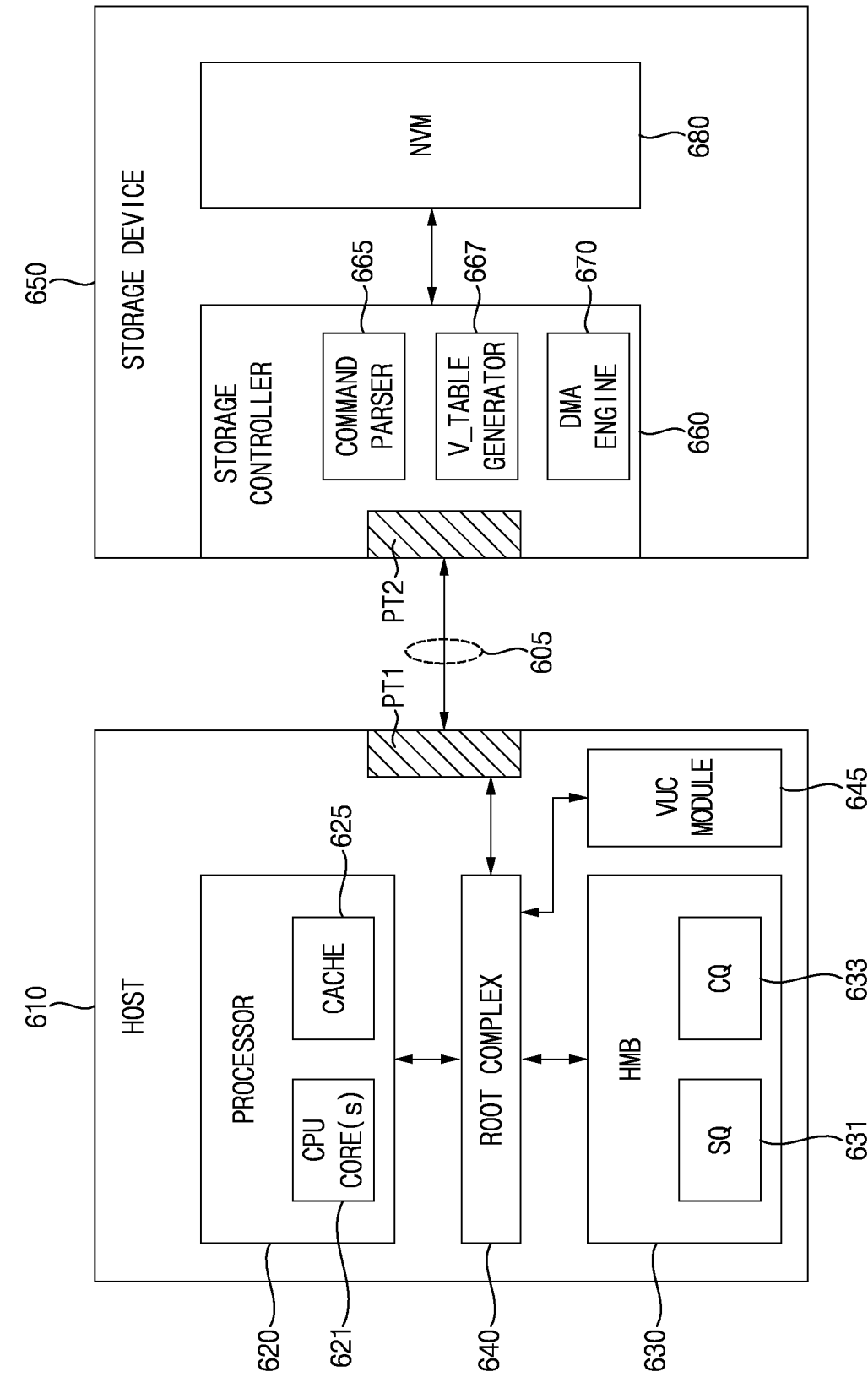
FIG. 21 is a block diagram illustrating a storage system according to example embodiments.

FIG. 21 is a block diagram illustrating a storage system according to example embodiments.

Referring to FIG. 21, a storage system 600 may include a host 610 and a storage device 650 connected to each other through a link 605. In embodiments, the host 610 and the storage device 650 may include more or less elements depending on functionality.

The host 610 may control overall operations of the storage system 600. For example, the host 610 may store data in the storage device 650 or may read data stored in the storage device 650. The host 610 may communicate with the storage device 650 through a first port PT1. In an embodiment, the first port PT1 may be a physical port that is based on a Peripheral Component Interconnect Express (PCIe) protocol. However, embodiments are not limited thereto.

Hereinafter, the host 610 and the storage device 650 may communicate with each other through a PCIe protocol-based physical port such as the first port PT1 and the second port PT2.

The host 610 may include a processor 620, a host memory buffer (HMB) 630, a VUC module 645 and a root complex 640.

The processor 620 may be referred to as a host processor and may include a CPU core(s) 621 and a cache 625 dedicated to the CPU core 621.

The HMB 630 may include a submission queue (SQ) 631 and a completion queue (CQ) 633. The submission queue 631 may be storage such as dedicated storage that stores a command to be provided to the storage device 650. The completion queue 633 may be storage such as dedicated storage that stores completion information about an operation completed in the storage device 650 based on the command.

The VUC module 645 may generate a VUC based on a virtual table provided from the storage device 650 as described above. In embodiments, the VUC module 645 may correspond to the VUC module 170.

The root complex 640 may be connected to the processor 620, the VUC module 645 and the HMB 630.

The storage device 650 may include a storage controller 660 and at least one nonvolatile memory device (NVM) 680.

The at least one nonvolatile memory device 680 may operate under control of the storage controller 660. The at least one nonvolatile memory device 680 may be a NAND flash memory device, however, the present disclosure is not limited thereto.

The storage controller 660 may include a command parser 665, a virtual table generator 667 and a direct memory access (DMA) engine 670.

The command parser 665 may parse the command and the VUC from the host 610 and may provide the parsed command to the nonvolatile memory device 680, and the DMA engine 670 may control a memory access on the nonvolatile memory device 680 or the HMB 630. The virtual table generator 667 may generate the virtual table including random values designating indexes corresponding to main functions and transmit the virtual table to the host 610. In embodiments, the virtual table generator 667 may correspond to the virtual table generator 390.

In an example embodiment, the host 610 and the storage device 650 may be connected to each other through a PCIe link 605 according to PCIe standards.

Figure 22:
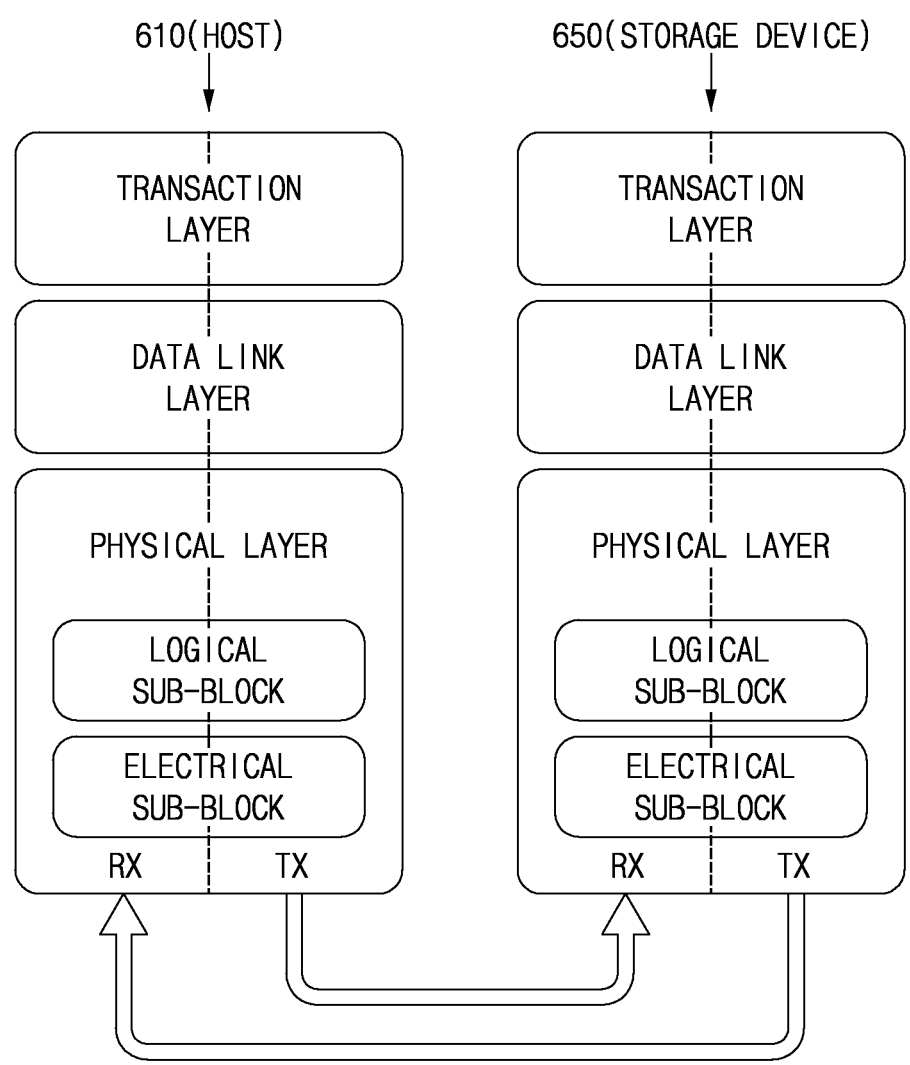
FIGS. 22 and 23 are diagrams illustrating an example of an interconnect architecture applied to a system according to example embodiments.
Figure 23:
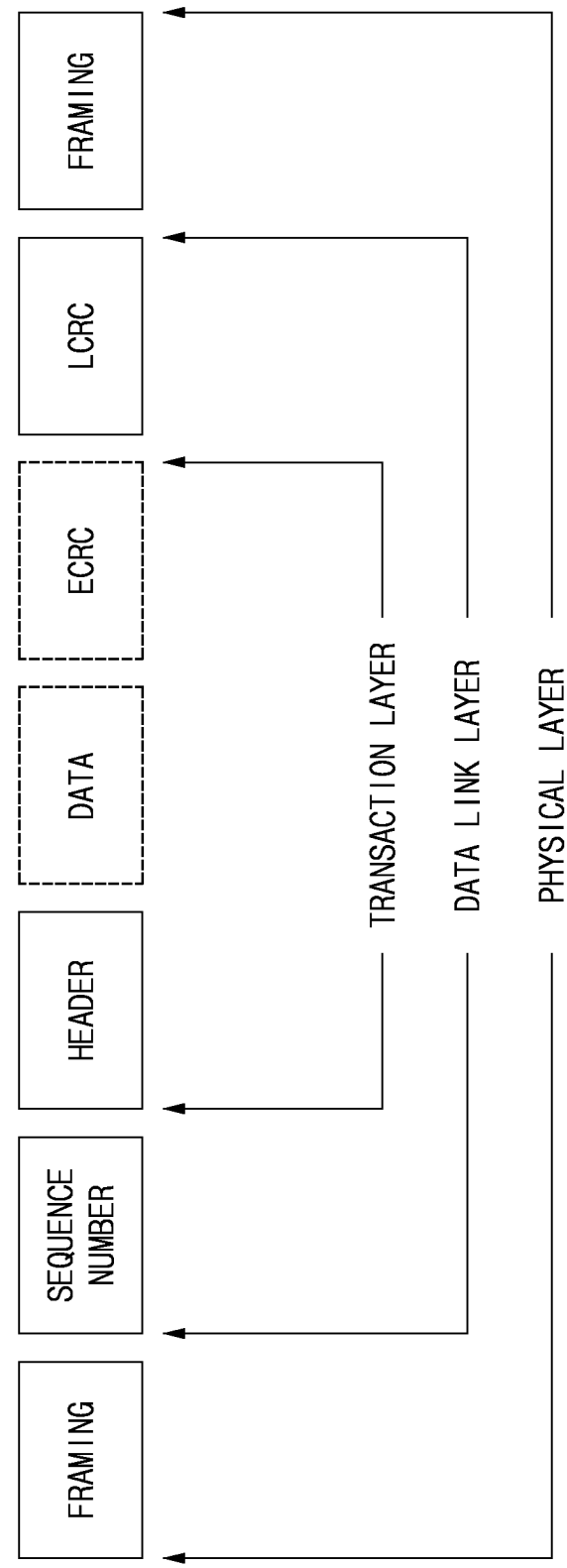

FIGS. 22 and 23 are diagrams illustrating an example of an interconnect architecture applied to a system according to example embodiments.

Referring to FIGS. 22 and 23, an embodiment of a layered protocol stack is illustrated. A layered protocol stack includes any form of a layered communication stack, such as a Quick Path Interconnect (QPI) stack, a PCIe stack, a next generation high performance computing interconnect stack, or other layered stack. Although example embodiments are in relation to a PCIe stack, the same concepts may be applied to other interconnect stacks. In one embodiment, the protocol stack is a PCIe protocol stack including a transaction layer, a data link layer, and a physical layer. An interface may be represented as communication protocol stack. Representation as a communication protocol stack may also be referred to as a module or interface implementing/including a protocol stack.

PCIe may use packets to communicate information between components. The packets are formed in the transaction layer and the data link layer to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that may be processed by the transaction layer of the receiving device.

In one embodiment, the transaction layer is to provide an interface between a device's processing core and the interconnect architecture, such as the data link layer and the physical layer. In this regard, a primary responsibility of the transaction layer is the assembly and disassembly of packets for example the transaction layer packets (TLPs). The translation layer manages credit-based flow control for TLPs. The PCIe implements split transactions, i.e. transactions with request and response separated by time, allowing a link to carry other traffic while the target device gathers data for the response.

In one embodiment, the transaction layer assembles packet header/payload. Format for current packet headers/payloads may be found in the PCIe specification.

The link layer, also referred to as the data link layer, acts as an intermediate stage between the transaction layer and the physical layer or the PHY layer. In one embodiment, a responsibility of the data link layer is providing a reliable mechanism for exchanging the TLPs between two the host 610 and the storage device 650 through a link. One side of the data link layer accepts TLPs assembled by the transaction layer, applies packet sequence identifier, i.e. a sequence number, an identification number or a packet number, calculates and applies an error detection code, and submits the modified TLPs to the physical layer for transmission across a physical to an external device.

In one embodiment, the physical layer includes a logical sub block and an electrical sub-block to physically transmit a packet to an external device. Here, the logical sub-block is responsible for the "digital" functions of the physical layer. In this regard, the logical sub-block includes a transmitter section to prepare outgoing information for transmission by the physical sub-block, and a receiver section to identify and prepare received information before passing it to the link layer.

The physical block includes a transmitter TX and a receiver RX. The transmitter TX is supplied by the logical sub-block with symbols, which the transmitter serializes and transmits onto to an external device. The receiver RX is supplied with serialized symbols from an external device and transforms the received signals into a bit-stream. The bit-stream is de-serialized and supplied to the logical sub-block. In one embodiment, an $8b/10b$ transmission code is employed, where ten-bit symbols are transmitted/received. Here, special symbols are used to frame a packet with frames. In addition, in one example, the receiver RX also provides a symbol clock recovered from the incoming serial stream.

As stated above, although the transaction layer, the link layer, and physical layer are discussed in reference to a specific embodiment of a PCIe protocol stack, a layered protocol stack is not so limited. In fact, any layered protocol may be included/implemented.

Figure 24:
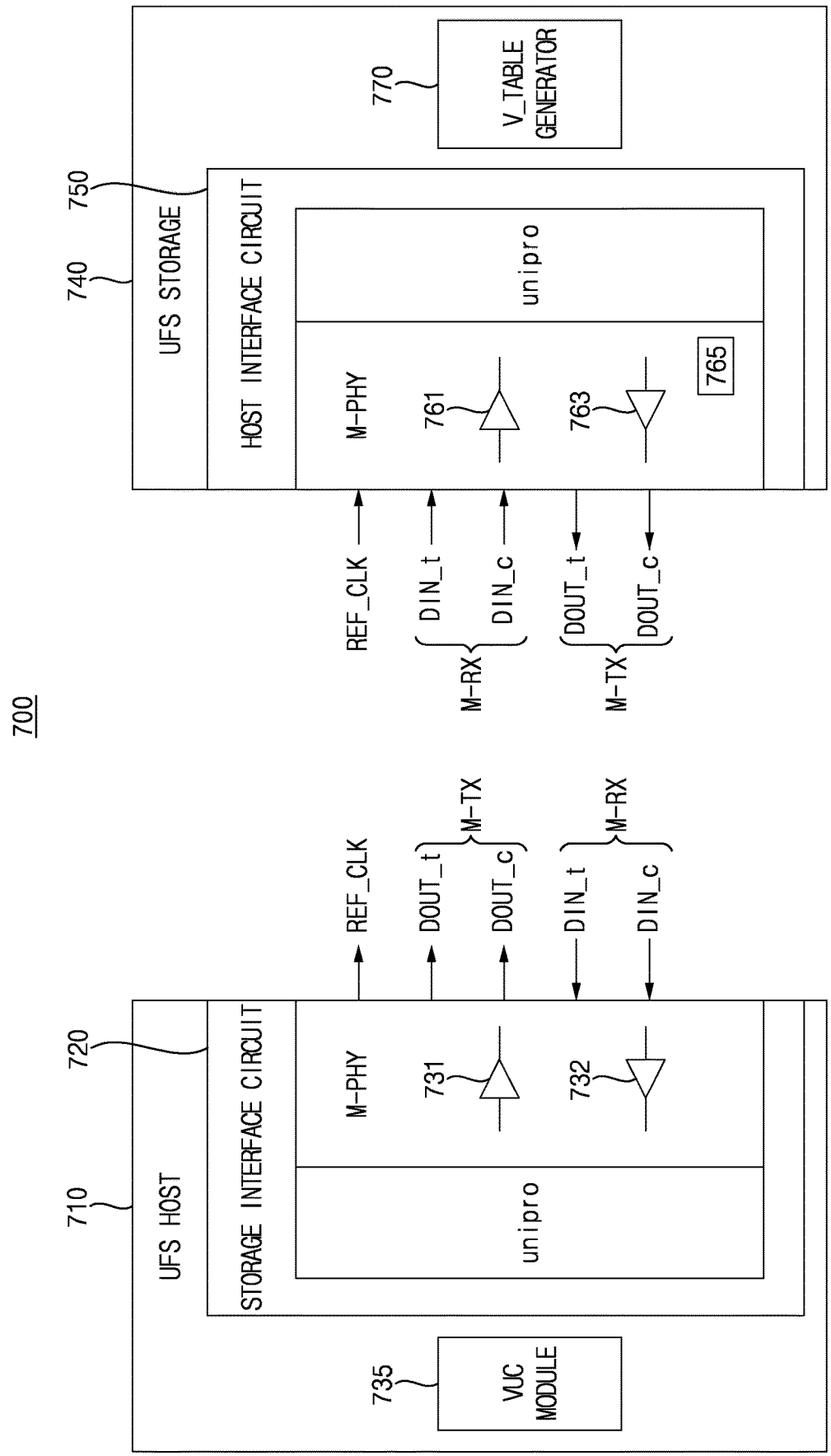
FIG. 24 is a block diagram illustrating a storage system according to example embodiments.

FIG. 24 is a block diagram illustrating a storage system according to example embodiments.

Referring to FIG. 24, a storage system 700 may include a universal flash storage (UFS) host 710 and a UFS storage device 740.

The UFS host 710 may include a first interface circuit 720, which may be a storage interface circuit, and a VUC module 735 and the UFS storage device 740 may include a second interface circuit 750, which may be a host interface circuit, and a virtual table generator 770.

The VUC module 735, as described above, may generate a VUC based on a virtual table transmitted from the UFS storage device 740. The virtual table generator 770 may generate the virtual table including random values designating indexes corresponding to main functions and may transmit the virtual table to the UFS host 710. In embodiments, the VUC module 735 may correspond to the VUC module 170, and the virtual table generator 770 may correspond to the virtual table generator 390.

The first interface circuit 720 may include a transmitter 731 and a receiver 732 and the second interface circuit 750 may include a receiver 761 and a transmitter 763

Figure 25:
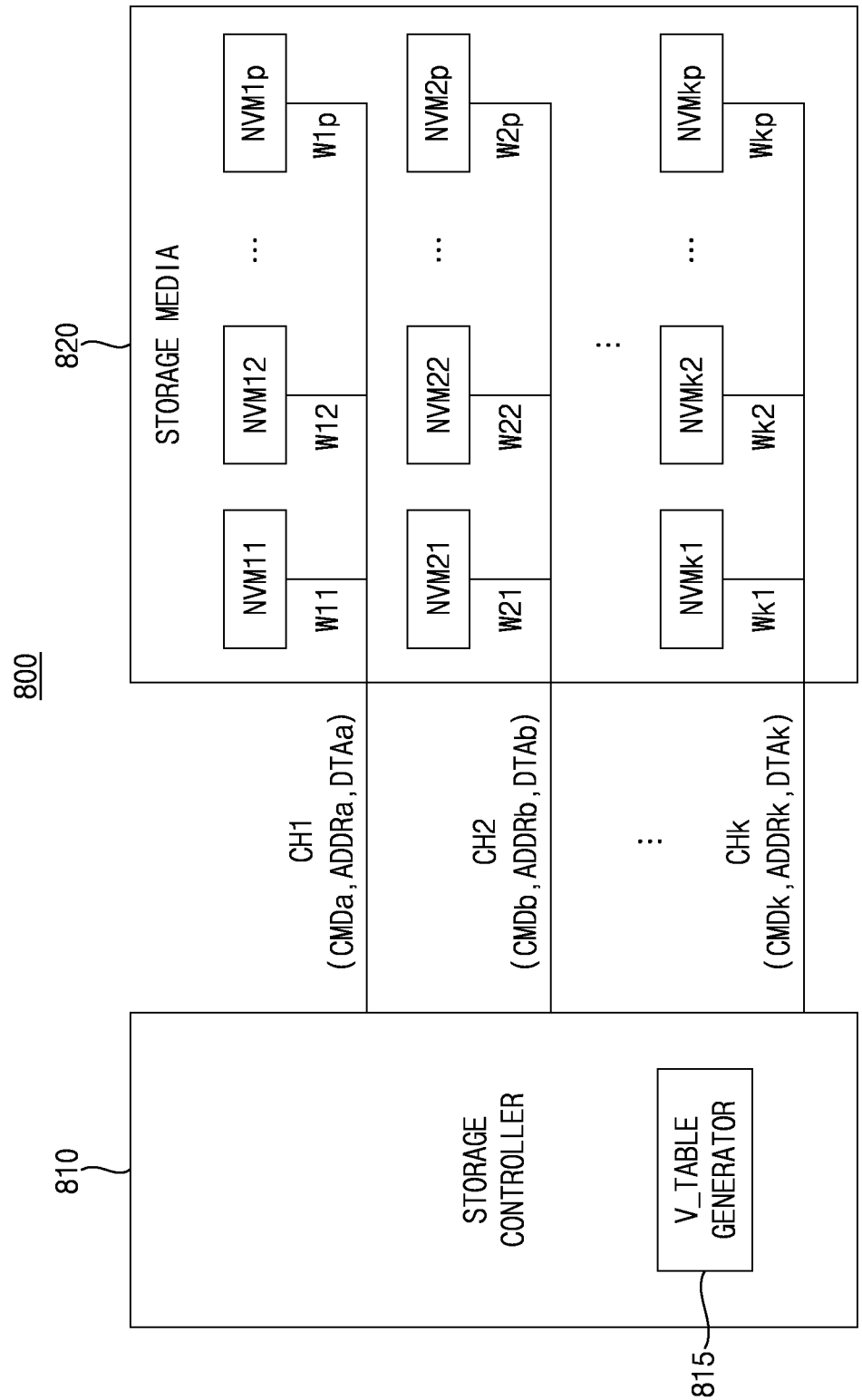
FIG. 25 is a block diagram illustrating a storage device according to example embodiments.

In FIG. 25, the first interface circuit 720 and the second interface circuit 750 may be referred to as a first interface circuit and a second interface circuit, respectively, and may include a physical layer M-PHY and a UniPro corresponding to interface protocols suggested by Mobile Industry Processor Interface (MIPI) Alliance. The physical layer M-PHY of the first interface circuit 720 may include a pair of lines of transferring a differential input signal pair DIN_t and DIN_c, a pair of lines of transferring a differential output signal pair DOUT_t and DOUT_c and a line of transferring a reference clock signal REF_CLK.

The physical layer M-PHY of the first interface circuit 720 may transfer signals to the second interface circuit 750 through the output terminals DOUT_t and DOUT_c. The output terminals DOUT_t and DOUT_c may be connected to the transmitter 731 and may constitute a transmit channel M-TX of the first interface circuit 720. For example, the signals that are transferred through the output terminals DOUT_t and DOUT_c may be a pair of differential signals. That is, a signal that is transferred through the output terminal DOUT_c may be complementary to a signal that is transferred through the output terminal DOUT_t.

The physical layer M-PHY of the first interface circuit 720 may receive signals from the second interface circuit 750 through the input terminals DIN_t and DIN_c. The input terminals DIN_t and DIN_c may be connected to the receiver 732 and may constitute a receive channel M-RX of the first interface circuit 720. For example, the signals that are received through the input terminals DIN_t and DIN_c may be a pair of differential signals. That is, a signal that is received through the input terminal DIN_c may be complementary to a signal that is received through the input terminal DIN_t.

The output terminals DOUT_t and DOUT_c and the input terminals DIN_t and DIN_c may be controlled to one of various states in compliance with a given protocol. For example, each of the output terminals DOUT_t and DOUT_c and the input terminals DIN_t and DIN_c may be controlled to a positive state, a negative state, a ground state, or a floating state.

When a level (e.g., a voltage level) of an output signal of the first output terminal DOUT_t is higher than a level of an output signal of the second output terminal DOUT_c, the output terminals DOUT_t and DOUT_c may be at the positive state. When the level of the output signal of the first output terminal DOUT_t is lower than the level of the output signal of the second output terminal DOUT_c, the output terminals DOUT_t and DOUT_c may be at the negative state. When the first output terminal DOUT_t and the second output terminal DOUT_c are floated, the output terminals DOUT_t and DOUT_c may be at the floating state DIF-Q. When the levels of the first output terminal DOUT_t and the second output terminal DOUT_c are equal, the output terminals DOUT_t and DOUT_c may be at the ground state.

When a level of an input signal of the first input terminal DIN_t is higher than a level of an input signal of the second input terminal DIN_c, the input terminals DIN_t and DIN_c may be at the positive state. When the level of the input signal of the first input terminal DIN_t is lower than the level of the input signal of the second input terminal DIN_c, the input terminals DIN_t and DIN_c may be at the negative state. When the first input terminal DIN_t and the second input terminal DIN_c are connected with terminals of a ground state, the input terminals DIN_t and DIN_c may be at the ground state. When the first input terminal DIN_t and the second input terminal DIN_c are floated, the input terminals DIN_t and DIN_c may be at the floating state.

The second interface circuit 750 may include input terminals DIN_t and DIN_c, output terminals DOUT_t and DOUT_c and a clock terminal REF_CLK.

The output terminals DOUT_t and DOUT_c of the second interface circuit 750 may correspond to the input terminals DIN_t and DIN_c of the first interface circuit 140*a*, and the input terminals DIN_t and DIN_c of the second interface circuit 750 may correspond to the output terminals DOUT_t and DOUT_c of the first interface circuit 720.

A physical layer M-PHY of the second interface circuit 750 may receive signals through the input terminals DIN_t and DIN_c and may transfer signals through the output terminals DOUT_t and DOUT_c. As in the above description given with reference to the first interface circuit 720, the output terminals DOUT_t and DOUT_c and the input terminals DIN_t and DIN_c of the second interface circuit 750 may be controlled to the positive state, the negative state, the ground state, or the floating state.

In embodiments, according to the MIPI M-PHY specification, the physical layer M-PHY of the second interface circuit may a reference clock detector 765. The reference clock detector 765 may detect a change between the idle mode and the active mode of the UFS storage device 740.

When the UFS storage device 740 does not execute any operation, the UFS storage device 740 may be in a first idle mode or a second idle mode. When UFS storage device 740 is in the first idle mode or the second idle mode, the first interface circuit 720 may not transfer the reference clock REF_CLK to the second interface circuit 750. When the UFS storage device 740 switches from the first idle mode and/or the second idle mode to the active mode, the input terminals DIN_t and DIN_c of the second interface circuit 750 may switch from the floating state to the negative state. When the UFS storage device 740 switches from the first idle mode and/or the second idle mode to the active mode, the first interface circuit 720 may resume a transfer of the reference clock REF_CLK to the second interface circuit 750.

In example embodiment, when the UFS storage device 740 is in the second idle mode, the reference clock detector 765 may generate a trigger signal for allowing the UFS storage device 740 to enter the active mode, based on toggling of the reference clock REF_CLK.

FIG. 25 is a block diagram illustrating a storage device according to example embodiments.

Referring to FIG. 25, a storage device 800 may include a storage controller 810 and a storage media 820. The storage device 800 may support a plurality of channels CH1, CH2, . . . , CHk, and the storage media 820 may be connected to the storage controller 810 through the plurality of channels CH1 to CHk. The storage controller 810 may include a virtual table generator 815 and the virtual table generator 815 may generate a virtual table including random values designating indexes corresponding to main functions and may transmit the virtual table to an authenticated host. In embodiments, the virtual table generator 815 may correspond to the virtual table generator 390.

The storage media 820 may include a plurality of nonvolatile memory devices NVM11, NVM12, . . . , NVM1$p$, NVM21, NVM22, . . . , NVM2$s$, NVMk1, NVMk2, . . . , NVMkp. For example, the nonvolatile memory devices NVM11 to NVMkp may correspond to the nonvolatile memory devices 400*a*-400*k* in FIG. 1. Each of the nonvolatile memory devices NVM11 to NVMkp may be connected to one of the plurality of channels CH1 to CHk through a connector corresponding thereto. For instance, the nonvolatile memory devices NVM11 to NVM1$p$ may be connected to the first channel CH1 through connector W11, W12, . . . , W1$p$, the nonvolatile memory devices NVM21 to NVM2$p$ may be connected to the second channel CH2 through connector W21, W22, . . . , W2$p$, and the nonvolatile memory devices NVMk1 to NVMkp may be connected to the k-th channel CHk through connector Wk1, Wk2, . . . , Wkp. In some example embodiments, each of the nonvolatile memory devices NVM11 to NVMkp may be implemented as an arbitrary memory unit that may operate according to an individual command from the storage controller 810. For example, each of the nonvolatile memory devices NVM11 to NVMkp may be implemented as a chip or a die, but example embodiments are not limited thereto.

The storage controller 810 may transmit and receive signals to and from the storage media 820 through the plurality of channels CH1 to CHk. For example, the storage controller 810 may correspond to the storage controller 300 in FIG. 1. For example, the storage controller 810 may transmit commands CMDa, CMDb, . . . , CMDk, addresses ADDRa, ADDRb, . . . , ADDRk and data DTAa, DTAb, . . . , DTAK to the storage media 820 through the channels CH1 to CHk or may receive the DTAa to DTAk from the storage media 820.

The storage controller 810 may select one of the nonvolatile memories NVM11 to NVMks, which is connected to each of the channels CH1 to CHk, by using a corresponding one of the channels CH1 to CHk, and may transmit and receive signals to and from the selected nonvolatile memory device. For example, the storage controller 810 may select the nonvolatile memory NVM11 from among the nonvolatile memories NVM11 to NVM1$p$ connected to the first channel CH1. The storage controller 810 may transmit the command CMDa, the address ADDRa and the DTAa to the selected nonvolatile memory device NVM11 through the first channel CH1 or may receive the DTAa from the selected nonvolatile memory device NVM11.

The storage controller 810 may transmit and receive signals to and from the storage media 820 in parallel through different channels.

Figure 26:
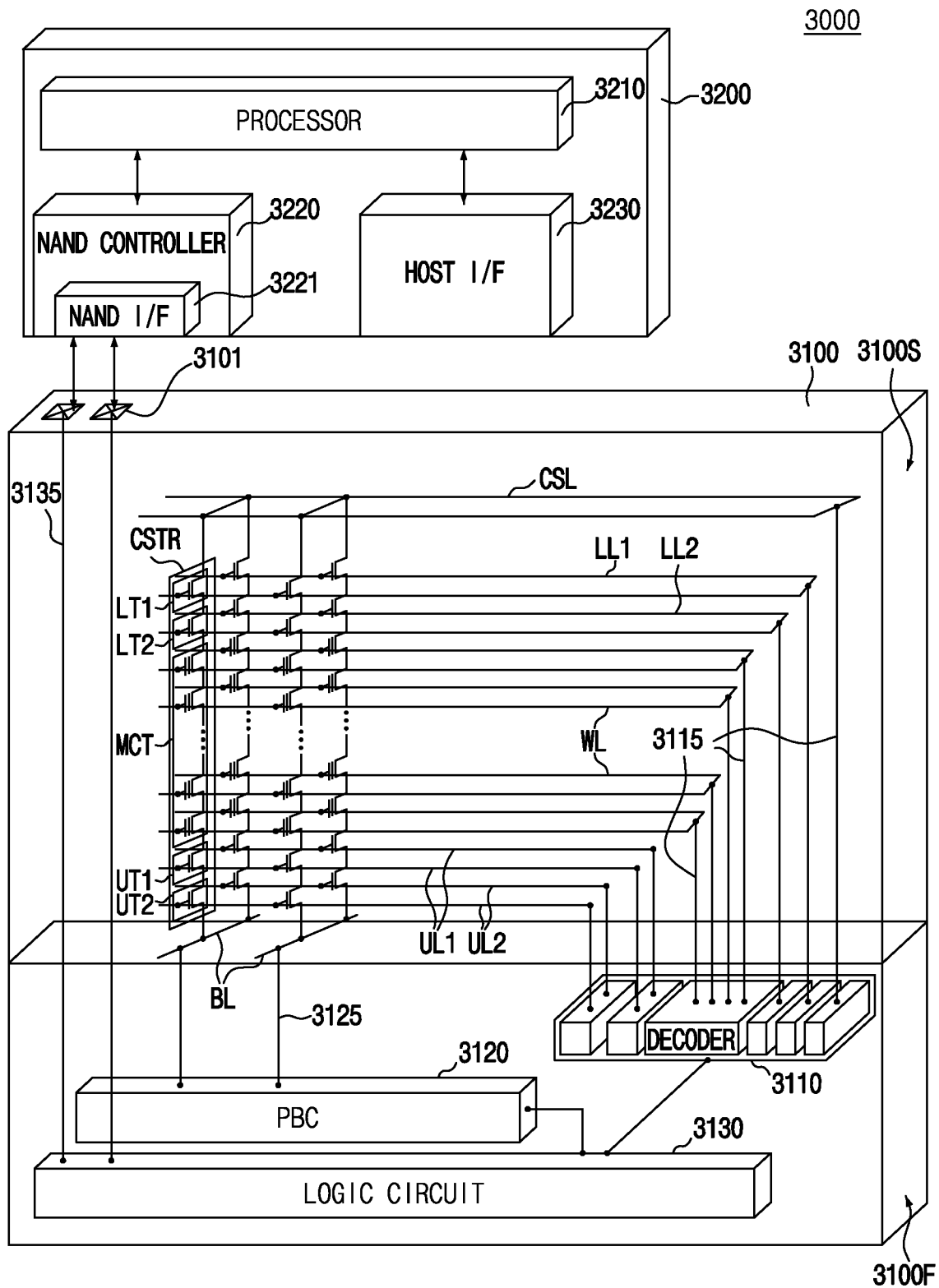
FIG. 26 is a block diagram illustrating an electronic system including a semiconductor device according to example embodiments.

FIG. 26 is a block diagram illustrating an electronic system including a semiconductor device according to example embodiments.

Referring to FIG. 26, an electronic system 3000 may include a semiconductor device 3100 and a controller 3200 electrically connected to the semiconductor device 3100. The electronic system 3000 may be a storage device including one or a plurality of semiconductor devices 3100 or an electronic device including a storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a non-volatile memory device, for example, a nonvolatile memory device that is explained with reference to FIGS. 6 to 11. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and (memory) cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with example embodiments.

In example embodiments, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In example embodiments, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

Figure 27:
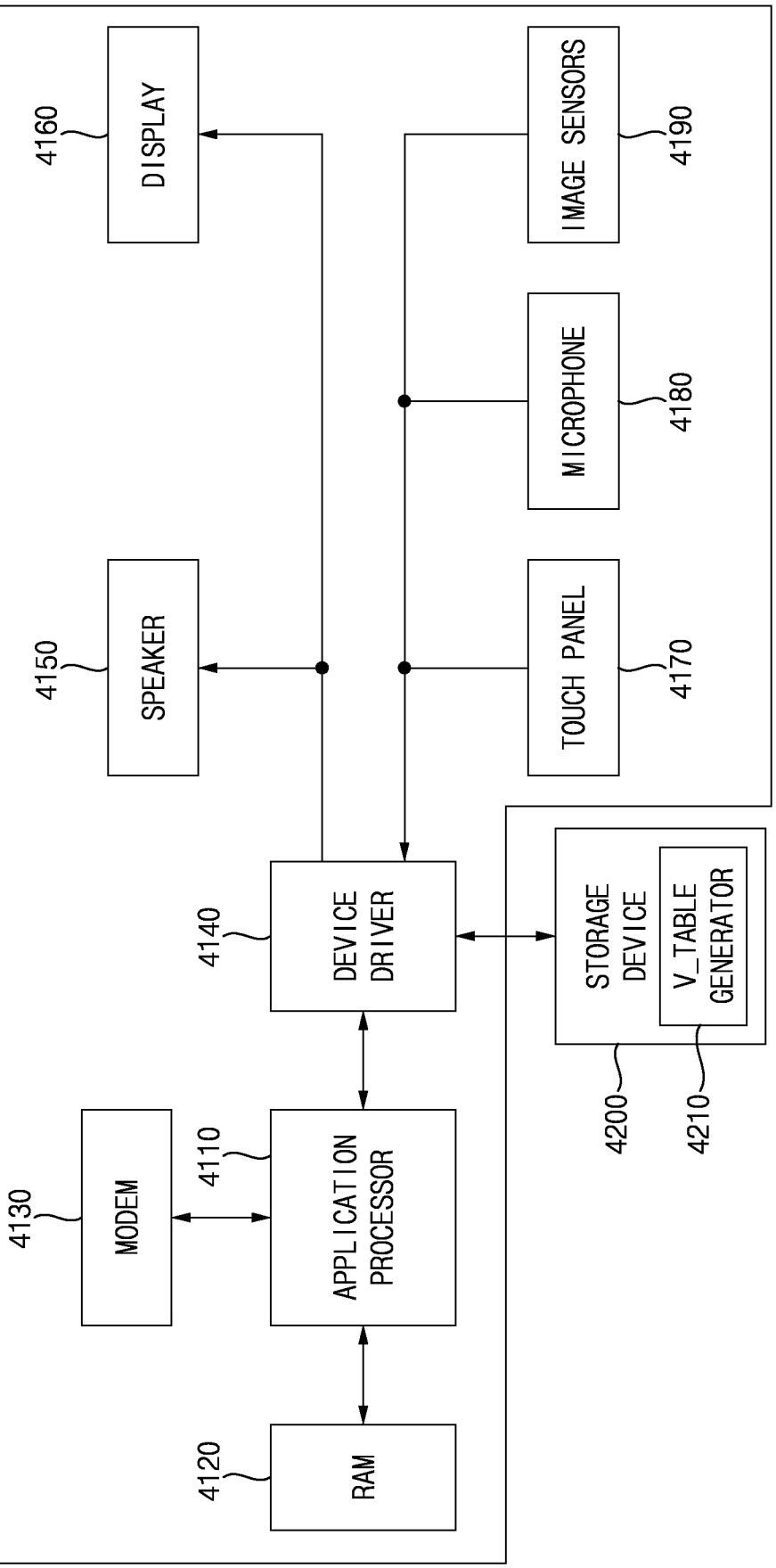
FIG. 27 is a block diagram illustrating a storage system according to example embodiments.

FIG. 27 is a block diagram illustrating a storage system according to example embodiments.

Referring to FIG. 27, a storage system 4000 may include a host 4100 and a storage device 4200. The storage device 4200 may include a virtual table generator 4210. The host 4100 and the storage device 4200 may operate as described with reference to FIGS. 1 to 20. In embodiments, the VUC module 735 may correspond to the VUC module 170, and the virtual table generator 4210 may correspond to the virtual table generator 390

The host 4100 may include an application processor 4110, a random access memory (RAM) 4120, a modem 4130, a device driver 4140, a speaker 4150, a display 4160, a touch panel 4170, a microphone 4180, and image sensors 4190.

The application processor 4110 may execute an application and a file system. The application processor 4110 may use the RAM 4120 as a system memory. The application processor 4110 may communicate with an external device through the modem 4130 in a wired fashion or wirelessly. For example, the modem 4130 may be embedded in the application processor 4110.

The application processor 4110 may communicate with peripheral devices through the device driver 4140. For example, the application processor 4110 may communicate with the speaker 4150, the display 4160, the touch panel 4170, the microphone 4180, the image sensors 4190, and the storage device 4200 through the device driver 4140.

The speaker 4150 and the display 4160 may be user output interfaces that transfer information to a user. The touch panel 4170, the microphone 4180, and the image sensors 4190 may be user input interfaces that receive information from the user.

Embodiments may be applied to various electronic devices including a storage device. For example, example embodiments may be applied to systems such as a memory card, a solid state drive (SSD), an embedded multimedia card (eMMC), a universal flash storage (UFS), a mobile phone, a smartphone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an Internet of Things (IOT) device, an Internet of Everything (IoE) device, an e-book, a virtual reality (VR) device, an augmented reality (AR) device, a server system, an automotive driving system, etc.

The description above corresponds to example embodiments and is not to be construed as limiting. Although a few example embodiments have been described, those skilled in the art will readily appreciate that many modifications are possible without materially departing from the scope of the present disclosure.

What is claimed is:

1. A storage system comprising:
a host; and
a storage device configured to communicate with the host, and comprising:
  at least one nonvolatile memory device configured to store data; and
  a storage controller configured to control the at least one nonvolatile memory device based on a request from the host,
wherein the storage controller is configured to:
  generate a virtual table comprising a plurality of random values, wherein each random value of the plurality of random values designates an index from among a plurality of indexes corresponding to a plurality of main functions; and
  transmit the virtual table to the host,
wherein the host is configured to:
  select a target function from among the plurality of main functions and a plurality of sub functions associated with the plurality of main functions, based on the virtual table;
  generate a vendor unique command (VUC) designating the target function; and
  transmit the VUC to the storage controller, and
wherein the storage controller is further configured to:
  parse the VUC based on the virtual table,
  perform an operation corresponding to the parsed VUC; and
  transmit a result of the operation to the host.

2. The storage system of claim 1,
wherein the storage controller comprises a virtual table generator configured to generate the virtual table based on a random number;
wherein the each random value comprises a plurality of sub-fields corresponding to a plurality of sub-parameters of the index;
wherein the plurality of sub-parameters comprises a first sub-parameter, a second sub-parameter and a third sub-parameter;
wherein each sub-field of the plurality of sub-fields is mapped to a corresponding index of the plurality of indexes;
wherein the plurality of sub-fields comprises a first sub-field corresponding to the first sub-parameter, a second sub-field corresponding to the second sub-parameter and a third sub-field corresponding to the third sub-parameter; and
wherein the virtual table generator is configured to generate the plurality of random values such that first sub-fields do not overlap.

3. The storage system of claim 2,
wherein the host comprises a command generator configured to generate a second random value designating the target function based on a first random value from among the plurality of random values, wherein the first random value designates a first main function from among the plurality of main functions, and wherein the host is further configured to transmit the second random value as the VUC to the storage controller.

4. The storage system of claim 3, wherein the command generator is further configured to generate the second random value by summing the second sub-parameter of the target function, the third sub-parameter of the target function, and the first random value.

5. The storage system of claim 4, wherein the command generator is further configured to discard a carry value when the summing results in a carry value.

6. The storage system of claim 3, wherein the command generator comprises:
a register configured to store the virtual table; and
a VUC module configured to generate the VUC based on the virtual table stored in the register.

7. The storage system of claim 2, wherein the virtual table generator is further configured to:
generate candidates for the plurality of random values based on the random number, wherein a number of the candidates is equal to a number of the first sub-fields; and
store the candidates in the virtual table based on the candidates not matching previous random values which are pre-stored in the virtual table.

8. The storage system of claim 1, wherein the virtual table further comprises the plurality of indexes,
wherein the storage controller is further configured to encrypt the virtual table and transmit the encrypted virtual table to the host, and
wherein the host is further configured to decrypt the encrypted virtual table and generate the VUC based on the decrypted virtual table.

9. The storage system of claim 1, wherein the storage controller comprises:
a host interface configured to communicate with the host;
a command manger comprising a virtual table generator configured to generate the virtual table;
an authentication engine comprising a key generator configured to generate a key value, wherein the authentication engine is configured to perform an authentication on the host based on the key value;
a memory interface configured to communicate with the at least one nonvolatile memory device; and
at least one processor configured to control the host interface, the command manger, the authentication engine and the memory interface.

10. The storage system of claim 1, wherein the host comprises:
a storage interface configured to communicate with the storage device;
a command generator configured to generate VUC the based on the virtual table;
an authentication engine comprising a key value generator configured to generate a key value, wherein the authentication engine is configured to perform an authentication on the storage device based on the key value; and
a host controller configured to control the storage interface, the command generator and the authentication engine.

11. The storage system of claim 1, wherein the storage device is further configured to communicate with the host based on a peripheral component interconnect (PCI) express protocol or a universal flash storage (UFS) protocol.

12. A storage system comprises:
a host; and
a storage device connected with the host through a link,
wherein the storage device is configured to communicate with the host,
wherein the storage device comprises:
at least one nonvolatile memory device configured to store data; and
a storage controller configured to control the at least one nonvolatile memory device based on a request from the host,
wherein the storage controller is configured to:
generate a virtual table comprising a plurality of random values, wherein each random value of the plurality of random values designates an index from among a plurality of indexes corresponding to a plurality of main functions; and
transmit the virtual table to the host,
wherein the host is configured to:
select a target function from among the plurality of main functions and a plurality of sub functions associated with the plurality of main functions, based on the virtual table;
generate a vendor unique command (VUC) designating the target function; and
transmit the VUC to the storage controller, and
wherein the storage controller is further configured to parse the VUC based on the virtual table and perform an operation corresponding to the parsed VUC, and
wherein the host is further configured to:
generate a second random value designating the target function based on a first random value from among the plurality of random values, wherein the first random value designates a first main function from among the plurality of main functions; and
transmit the second random value as the VUC to the storage controller.

13. A storage device comprising:
at least one nonvolatile memory device configured to store data; and
a storage controller configured to:
generate a virtual table comprising a plurality of random values, wherein each random value of the plurality of random values designates an index from among a plurality of indexes corresponding to a plurality of main functions;
transmit the virtual table to a host;
receive from the host a vendor unique command (VUC) generated by the host based on the virtual table;
parse the VUC based on the virtual table,
perform an operation corresponding to the at least one nonvolatile memory device based on the parsed VUC; and
transmit a result of the operation to the host.

14. The storage device of claim 13, wherein the virtual table further comprises the plurality of indexes, and
wherein the storage controller is further configured to encrypt the virtual table, and to transmit the encrypted virtual table to the host.

15. The storage device of claim 13, wherein the storage controller is further configured to:
based on receiving an authentication request from the host, perform an authentication on the host by exchanging a key value with the host; and
generate the virtual table based on the authentication being successful, and wherein the storage controller is further configured to generate a new virtual table and transmit the new virtual table to the host based on at least one of a predetermined period of time passing, or an event from an outside of the storage device occurring after a connection is established between the storage controller and the host.

16. The storage device of claim 13, wherein the storage controller is further configured to:
based on receiving an authentication request from the host, perform a first authentication on the host by exchanging key values with the host;
perform a second authentication on the host using a physical secure module based on the first authentication being successful; and
generate the virtual table based on the second authentication being successful.

17. The storage device of claim 13, wherein the storage controller comprises a virtual table generator configured to generate the virtual table based on a random number;
wherein the each random value comprises a plurality of sub-fields corresponding to a plurality of sub-parameters of a main function of the plurality of main functions;
wherein the plurality of sub-parameters comprise a first sub-parameter, a second sub-parameter and a third sub-parameter;
wherein each sub-field of the plurality of sub-fields is mapped to a corresponding index of the plurality of indexes;
wherein the plurality of sub-fields comprise a first sub-field corresponding to the first sub-parameter, a second sub-field corresponding to the second sub-parameter and a third sub-field corresponding to the third sub-parameter; and wherein the virtual table generator is further configured to generate the plurality of random values such that first sub-fields do not overlap.

18. The storage device of claim 17, wherein the virtual table generator is further configured to:
generate candidates for the plurality of random values based on the random number, wherein a number of the candidates is equal to a number of the first sub-fields; and
store the candidates in the virtual table based on previous random values which are pre-stored in the virtual table.

19. The storage device of claim 13, wherein for each session of a plurality of sessions with the host, the storage controller is further configured to:
perform an authentication on the host;
generate the virtual table based on the authentication being successful; and
transmit the virtual table to the host.

20. The storage device of claim 13, wherein the storage controller comprises:
a host interface configured to communicate with the host;
a command manager comprising a virtual table generator configured to generate the virtual table;
an authentication engine comprising a key generator configured to generate a key value, wherein the authentication engine is configured to perform an authentication on the host based on the key value;
a memory interface configured to communicate with the at least one nonvolatile memory device; and
a processor configured to control the command manager, the authentication engine, and the memory interface.

* * * * *